(12) United States Patent
Bao et al.

(10) Patent No.: US 11,212,692 B2
(45) Date of Patent: Dec. 28, 2021

(54) NON-CONNECTION STATE MEASUREMENT METHOD, USER EQUIPMENT, AND BASE STATION

(71) Applicant: VIVO MOBILE COMMUNICATION CO., LTD., Guangdong (CN)

(72) Inventors: Wei Bao, Guangdong (CN); Xiaodong Yang, Guangdong (CN); Jingzhi Ma, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

(21) Appl. No.: 16/758,895

(22) PCT Filed: Oct. 11, 2018

(86) PCT No.: PCT/CN2018/109834
§ 371 (c)(1),
(2) Date: Apr. 24, 2020

(87) PCT Pub. No.: WO2019/095906
PCT Pub. Date: May 23, 2019

(65) Prior Publication Data
US 2020/0351689 A1 Nov. 5, 2020

(30) Foreign Application Priority Data
Nov. 16, 2017 (CN) .......................... 201711138908.9

(51) Int. Cl.
*H04W 36/00* (2009.01)
*H04W 24/10* (2009.01)

(52) U.S. Cl.
CPC ....... *H04W 24/10* (2013.01); *H04W 36/0058* (2018.08); *H04W 36/0072* (2013.01)

(58) Field of Classification Search
CPC ............. H04W 24/10; H04W 36/0072; H04W 36/0058; H04W 64/00; H04W 16/18
(Continued)

(56) References Cited

U.S. PATENT DOCUMENTS

| 7,047,009 B2* | 5/2006 | Laroia | ............... | H04W 36/18 455/437 |
| 7,212,821 B2* | 5/2007 | Laroia | ............... | H04W 36/06 455/436 |

(Continued)

FOREIGN PATENT DOCUMENTS

| CN | 102149106 A | 8/2011 |
| CN | 102231894 A | 11/2011 |

(Continued)

OTHER PUBLICATIONS

First Office Action dated Feb. 21, 2020 issued in Chinese Application No. 201711138908.9.
(Continued)

*Primary Examiner* — Marceau Milord
(74) *Attorney, Agent, or Firm* — Gearhart Law LLC; David Postolski

(57) ABSTRACT

A non-connection state measurement method, UE, and a base station are provided. The measurement method according to this disclosure includes: acquiring measurement configuration information, where the measurement configuration information includes one or more frequencies; starting, by the UE in a non-connection state, to perform measurements in the one or more frequencies according to the measurement configuration information; and reporting, by the UE after the UE enters a connected state from the non-connection state, a measurement result obtained from the measurements.

18 Claims, 13 Drawing Sheets

(58) Field of Classification Search
USPC .................................. 455/437, 436, 439
See application file for complete search history.

(56) References Cited

U.S. PATENT DOCUMENTS

| | | | | |
|---|---|---|---|---|
| 8,554,211 | B2* | 10/2013 | Angelow | H04J 11/0093 455/434 |
| 8,644,277 | B2* | 2/2014 | Zhang | H04W 74/008 370/338 |
| 9,042,883 | B2* | 5/2015 | Wang | H04J 11/0093 455/432.1 |
| 9,137,695 | B2* | 9/2015 | Shi | H04W 36/0088 |
| 9,191,867 | B2* | 11/2015 | Sambhwani | H04W 36/0072 |
| 9,264,929 | B2* | 2/2016 | Jung | H04W 24/10 |
| 9,277,523 | B2* | 3/2016 | Sampath | H04W 4/025 |
| 9,294,951 | B2* | 3/2016 | Pu | H04W 24/10 |
| 9,379,835 | B2* | 6/2016 | Song | H04W 24/10 |
| 9,467,885 | B2* | 10/2016 | Tenny | H04W 24/10 |
| 9,485,771 | B2* | 11/2016 | Kilpatrick, II | H04W 36/245 |
| 9,510,335 | B2* | 11/2016 | Ko | H04L 1/0061 |
| 9,542,016 | B2* | 1/2017 | Armstrong-Muntner | G06F 3/042 |
| 9,642,016 | B2* | 5/2017 | Wang | H04W 16/24 |
| 9,648,511 | B2* | 5/2017 | Kim | H04W 64/00 |
| 9,775,188 | B2* | 9/2017 | Kim | H04W 76/11 |
| 9,826,444 | B2* | 11/2017 | Joseph | H04W 36/0085 |
| 9,867,067 | B2* | 1/2018 | Jarvis | H04W 4/80 |
| 9,918,271 | B2* | 3/2018 | Yang | H04W 48/20 |
| 9,930,558 | B2* | 3/2018 | Sahin | H04W 16/14 |
| 9,961,573 | B2* | 5/2018 | Kazmi | H04W 24/10 |
| 10,201,025 | B2* | 2/2019 | Sorrentino | H04L 5/0032 |
| 10,244,436 | B2* | 3/2019 | Kim | H04W 48/16 |
| 10,477,421 | B2* | 11/2019 | Bienas | H04W 72/085 |
| 10,595,359 | B2* | 3/2020 | Kim | H04W 76/15 |
| 10,721,660 | B2* | 7/2020 | Hui | H04W 36/023 |
| 10,863,500 | B2* | 12/2020 | Yang | H04W 72/0413 |
| 2011/0103249 | A1 | 5/2011 | Kim et al. | |
| 2013/0070632 | A1 | 3/2013 | Jung et al. | |
| 2014/0287694 | A1* | 9/2014 | Kim | H04W 16/18 455/67.13 |
| 2015/0271713 | A1 | 9/2015 | Kim et al. | |
| 2015/0341848 | A1 | 11/2015 | Song et al. | |
| 2016/0323929 | A1 | 11/2016 | Goldhofer et al. | |
| 2016/0330641 | A1* | 11/2016 | Zhang | H04W 72/0453 |
| 2017/0353989 | A1* | 12/2017 | Kim | H04W 76/11 |
| 2018/0124676 | A1 | 5/2018 | Zeng et al. | |
| 2018/0270791 | A1* | 9/2018 | Park | H04W 8/24 |
| 2018/0367998 | A1* | 12/2018 | Kunz | H04W 36/08 |
| 2019/0089447 | A1* | 3/2019 | Sang | H04W 36/305 |
| 2019/0159076 | A1* | 5/2019 | Kim | H04W 76/20 |

FOREIGN PATENT DOCUMENTS

| | | |
|---|---|---|
| CN | 102948201 A | 2/2013 |
| CN | 103634838 A | 3/2014 |
| CN | 103988540 A | 8/2014 |
| CN | 105991255 A | 10/2016 |
| CN | 106068658 A | 11/2016 |
| CN | 106332233 A | 1/2017 |
| CN | 107295558 A | 10/2017 |
| WO | 2012023161 A1 | 2/2012 |
| WO | 2015106237 A1 | 7/2015 |
| WO | 2016056979 A1 | 4/2016 |

OTHER PUBLICATIONS

Written Opinion dated May 28, 2020 issued in PCT/CN2018/109834.
Extended European Search Report dated Nov. 19, 2020 issued in PCT/CN2018/109834.
3GPP TSG-RAN WG2 Meeting #99, R2-1708546, Berlin, Germany Aug. 21-25, 2017, "Measurement Enhancement tor Fast SCell Set Up", 3 pages.
3GPP TSG-RAN2 Meeting #99, R2-1710152(Resubmission of R2-1707788), Prague, Czech Republic Oct. 9-13, 2017, "Fast SCell Configuralion and Activation Through Network Assisted RRC_Idle Mode Measurements", 5 pages.
Second Office Action dated Oct. 22, 2020 issued in Chinese Application No. 201711138908.9.
Third Office Action for CN 201711138908.9, dated Nov. 15, 2021, 9 pages and 6 pages of translation.

* cited by examiner

NON-CONNECTION STATE MEASUREMENT METHOD, USER EQUIPMENT, AND BASE STATION

CROSS-REFERENCE TO RELATED APPLICATION

The present application is a U.S. national phase application of a PCT Application No. PCT/CN2018/109834 filed on Oct. 11, 2018 which claims a priority to Chinese Patent Application No. 201711138908.9 filed in China on Nov. 16, 2017, a disclosure of which is incorporated in its entirety by reference herein.

TECHNICAL FIELD

The present disclosure relates to the field of communication application technology, in particular to a non-connection state measurement method, user equipment (UE), and a base station.

BACKGROUND

In carrier aggregation (CA), UE uses spectrum resources of a plurality of serving cells simultaneously to perform data transmission, thereby improving a throughput of data reception and transmission of the UE.

A serving cell of UE is configured by a network. The network usually selects, based on measurement results of neighboring cells reported by the UE, a cell with signal quality satisfying a specific condition, and configures the cell as the serving cell of the UE. Measurement parameters (for example, a measurement frequency, and a measurement quantity (a reference signal received power (RSRP) and/or a reference signal received quality (RSRQ)) for measurement of a neighboring cell and a reporting configuration (a report triggering condition, a measurement quantity to be reported or the like) of the UE are configured by the network. Activation of security mode is required before a measurement can be configured and reported. Referring to FIG. 1 for details, FIG. 1 is a flowchart of interaction between UE and a base station during measurements in frequencies in the related art. As can be seen from FIG. 1, there is a significant latency from when user equipment (UE) enters a connected state to when the UE starts transmission by using a secondary cell. When an amount of data to be transmitted is not very large, transmission of the data may be completed before the network activates multi-cell transmission or secondary-cell transmission, thus a peak rate experienced by a user is low.

SUMMARY

In a first aspect, the present disclosure provides in some embodiments a non-connection state measurement method, applied to UE, including:

acquiring measurement configuration information, where the measurement configuration information includes one or more frequencies;

starting, by the UE in a non-connection state, to perform measurements in the one or more frequencies according to the measurement configuration information; and reporting, by the UE after the UE enters a connected state from the non-connection state, a measurement result obtained from the measurements.

In a second aspect, the present disclosure further provides in some embodiments a non-connection state measurement method, applied to a base station, including:

indicating measurement configuration information to UE, where the measurement configuration information instructs the UE in a non-connection state to start to perform measurements in frequencies, and the measurement configuration information includes one or more frequencies;

acquiring a measurement result reported by the UE according to the measurement configuration information, where the measurement result is reported by the UE after the UE enters a connected state from the non-connection state; and configuring a secondary cell for the UE according to the measurement result and activating the secondary cell.

In a third aspect, the present disclosure further provides in some embodiments UE, including:

a first acquisition module, configured to acquire measurement configuration information, where the measurement configuration information includes one or more frequencies;

a measurement module, configured to enable the UE in a non-connection state to start to perform measurements in the one or more frequencies according to the measurement configuration information; and a reporting module, configured to report, after it is detected that the UE enters a connected state from the non-connection state, a measurement result obtained from the measurements.

In fourth aspect, the present disclosure further provides in some embodiments UE, including: a storage, a processor, and a computer program stored in the storage and configured to be executed by the processor, where the processor is configured to execute the computer program to implement the steps in the foregoing non-connection state measurement method applied to the UE.

In a fifth aspect, the present disclosure further provides in some embodiments a computer-readable storage medium storing therein a computer program, where the computer program is configured to be executed by a processor to implement the steps in the foregoing non-connection state measurement method applied to UE.

In a sixth aspect, the present disclosure further provides in some embodiments a base station, including:

an indication module, configured to indicate measurement configuration information to UE, where the measurement configuration information instructs the UE in a non-connection state to start to perform measurements in frequencies, and the measurement configuration information includes one or more frequencies;

a second acquisition module, configured to acquire a measurement result reported by the UE according to the measurement configuration information, where the measurement result is reported by the UE after the UE enters a connected state from the non-connection state; and a configuration module, configured to configure a secondary cell for the UE according to the measurement result and activate the secondary cell.

In a seventh aspect, the present disclosure further provides in some embodiments a base station, including: a storage, a processor, and a computer program stored in the storage and configured to be executed by the processor, where the processor is configured to execute the computer program to implement the steps in the foregoing non-connection state measurement method applied to the base station.

In an eighth aspect, the present disclosure further provides in some embodiments a computer-readable storage medium storing therein a computer program, where the computer program is configured to be executed by a processor to implement the steps in the foregoing non-connection state measurement method applied to a base station.

BRIEF DESCRIPTION OF THE DRAWINGS

To describe the technical solutions in the embodiments of the present disclosure more clearly, the accompanying drawings required for describing the embodiments of the present disclosure are briefly described hereinafter. Apparently, the drawings accompanying the following descriptions show only some embodiments of the present disclosure, and a person of ordinary skill in the art may still derive other drawings from these accompanying drawings without creative efforts.

DETAILED DESCRIPTION

The technical solutions in the embodiments of the present disclosure are clearly and thoroughly described below with reference to the accompanying drawings of the embodiments of the present disclosure. Apparently, the described embodiments are merely some embodiments of the present disclosure, but are not all the embodiments. Based on the embodiments of the present disclosure, all other embodiments derived by a person of ordinary skill in the art without creative efforts shall fall within the scope of the present disclosure. The expression "and/or" used in the claims and the specification represents at least one of the connected objects.

Figure 1:
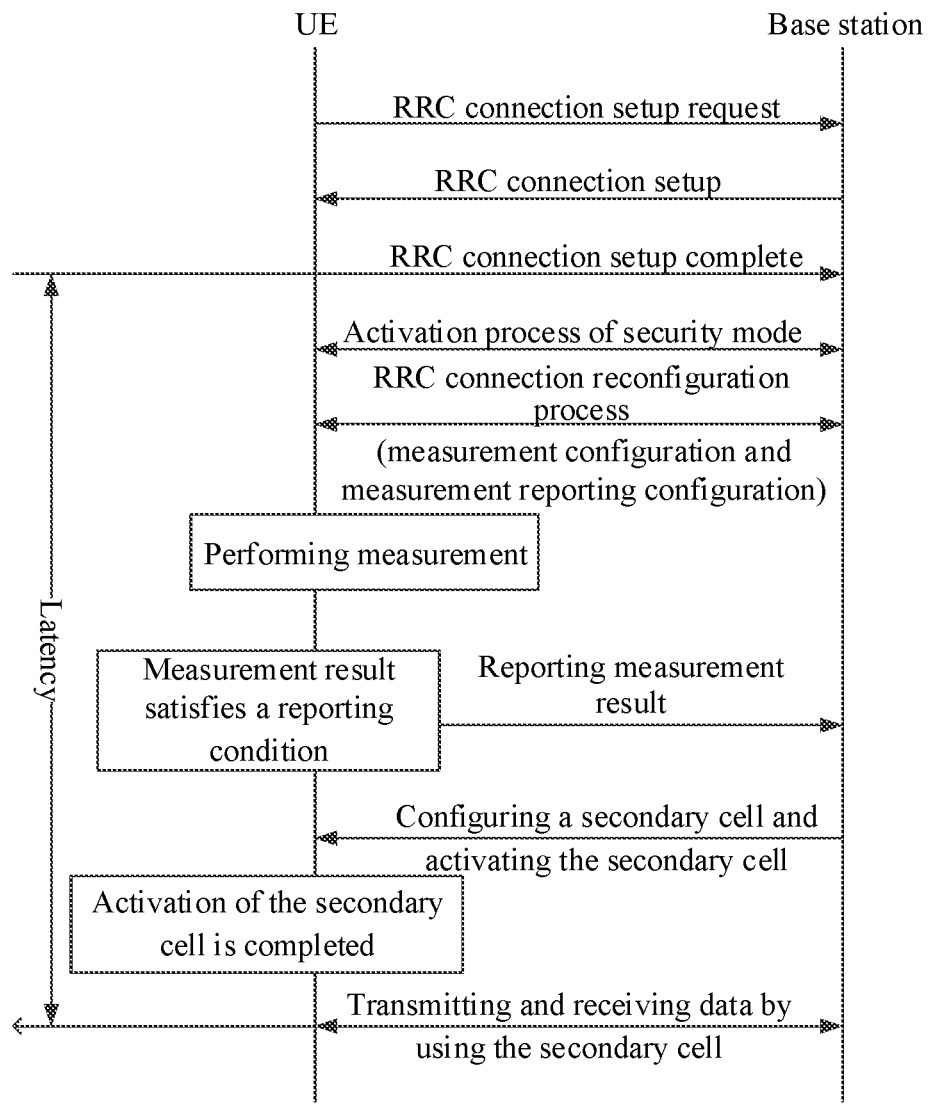
FIG. 1 is a flowchart of interaction between UE and a base station during measurements in frequencies in the related art.
Figure 2:
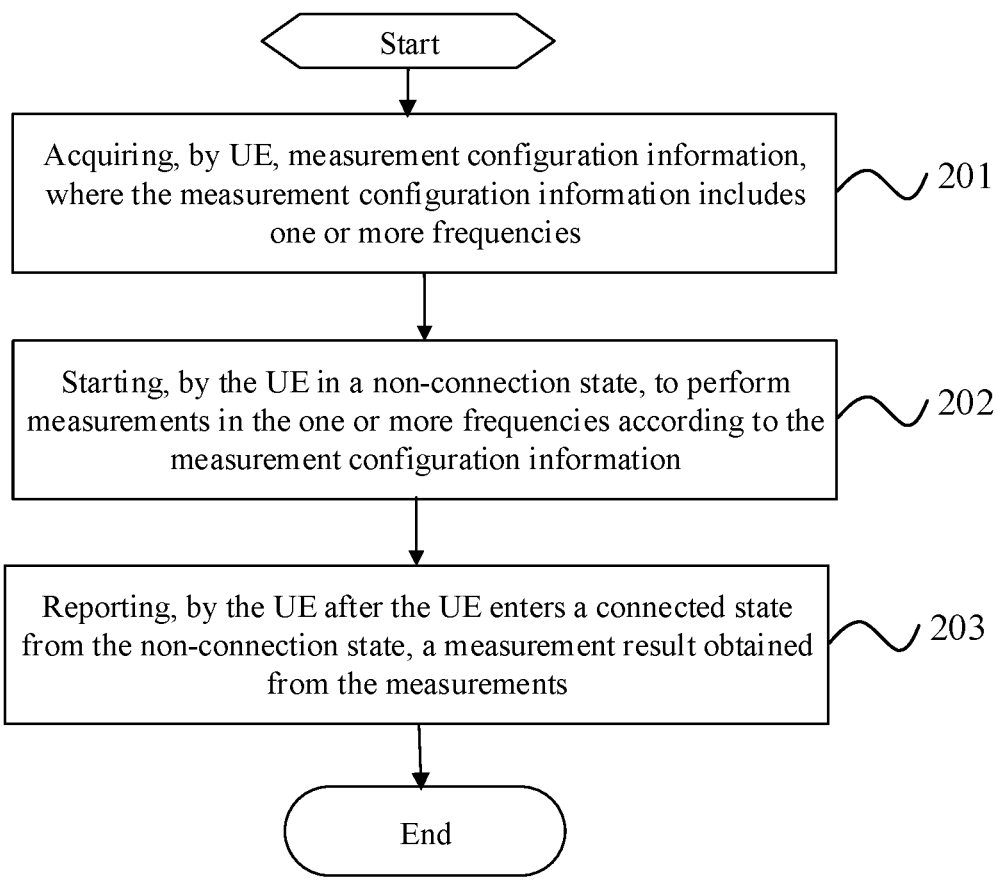
FIG. 2 is a first schematic flowchart of a non-connection state measurement method according to some embodiments of the present disclosure.

FIG. 2 is a first schematic flowchart of a non-connection state measurement method according to some embodiments of the present disclosure. As shown in FIG. 2, the present disclosure provides in some embodiments a non-connection state measurement method. The method is applied to UE, and includes the following steps.

Step 201: Acquiring, by the UE, measurement configuration information, where the measurement configuration information includes one or more frequencies.

The measurement configuration information may further include a measurement quantity to be measured, where the measurement quantity to be measured includes at least one of an RSRP or an RSRQ.

The measurement configuration information may further include report configuration information.

The report configuration information includes target measurement information to be reported and a reporting condition. The reporting condition includes a signal quality threshold for reporting and a time to trigger (TTT). The target measurement information may specifically include at least one of an RSRP or an RSRQ.

The signal quality threshold for reporting refers to that reporting is triggered only when the signal quality is greater than the threshold. The TTT refers to that reporting is triggered only when the signal quality has been greater than the threshold for a particular duration.

Step 202: Starting, by the UE in a non-connection state, to perform measurements in the one or more frequencies according to the measurement configuration information.

Specifically, one or more frequencies are selected from N frequencies for signal quality measurement. The UE in the non-connection state includes the UE in an idle state or the UE in an inactive state. N is a positive integer.

Step 202 may specifically include: selecting a first preset quantity of frequencies from frequencies included in the measurement configuration information to perform measurement; or randomly selecting a preset quantity of frequencies from frequencies included in the measurement configuration information to perform measurement.

For example, first X frequencies are selected from N frequencies to perform measurement or X frequencies are randomly selected from the N frequencies to perform measurement, where N is a positive integer, and X is a positive integer less than or equal to N.

Preferably, when it is detected that a measurement trigger condition is satisfied, the UE in the non-connection state starts to perform the measurements according to the measurement configuration information.

The measurement trigger condition includes:

a paging message for the UE is received; or a predetermined moment before a paging occasion when a paging message is received is reached, a time interval between the predetermined moment and the paging occasion is determined in a protocol or configured by a base station; or a start signal for non-connection state measurement is received; or the UE has uplink data to transmit; or the measurement configuration information is received.

In addition, the UE stops the measurements when a radio resource control (RRC) connection complete message or an RRC connection resume complete message is transmitted, or a measurement result is reported; or the UE stops the measurements after an RRC connection complete message or an RRC connection resume complete message has been transmitted or a measurement result has been reported; or the UE stops the measurements if the measurements are started at a predetermined moment before a paging occasion when a paging message is received, and the UE does not detect that the UE is paged at the paging occasion, where a time interval between the predetermined moment and the paging occasion is determined in a protocol or configured by a base station; or the UE stops the measurements after an RRC connection setup fails; or the UE stops the measurements after the UE receives a connected-state measurement configuration; or the UE stops the measurements if a preset time duration has elapsed since the UE started the measurement, where the preset time duration is specified in a protocol or configured by a base station or is equal to a valid time of the measurement configuration information.

Step 203: Reporting, by the UE after the UE enters a connected state from the non-connection state, a measurement result obtained from the measurements.

In the non-connection state measurement method in embodiments of the present disclosure, UE in a non-connection state starts to perform measurements in frequencies according to measurement configuration information indicated by a base station, and after entering a connected state from the non-connection state, the UE reports a measurement result obtained from the measurements. According to some embodiments of the present disclosure, UE starts to perform measurements in frequencies while the UE is in a non-connection state, and therefore after entering a connected state, the UE can rapidly report a measurement result, so that a base station can configure a secondary cell in advance according to the measurement result, thereby reducing the latency from when the UE enters the connected state to when high-speed data transmission may start.

As an optional implementation, the step 201 of acquiring measurement configuration information may include: acquiring the measurement configuration information from a message broadcasted by a network.

As another optional implementation, the step 201 of acquiring measurement configuration information includes: acquiring the measurement configuration information from an RRC dedicated message.

The RRC dedicated message may be specifically an RRC connection release message used by a network to release an RRC connection of the UE so that the UE may enter the non-connection state.

If the measurement configuration information is acquired from the RRC dedicated message, the step 202 of starting, by the UE in a non-connection state, to perform measurements in the one or more frequencies according to the measurement configuration information includes:

detecting whether the measurement configuration information from the RRC dedicated message is valid;

if the measurement configuration information from the RRC dedicated message is invalid, when it is detected that the message broadcasted by the network carries the measurement configuration information, starting to perform the measurements according to the measurement configuration information carried in the message broadcasted by the network; and if the measurement configuration information from the RRC dedicated message is valid, starting to perform the measurements according to the measurement configuration information from the RRC dedicated message.

The measurement configuration information further includes a valid time of the measurement configuration information; and the step of starting to perform the measurements according to the measurement configuration information carried in the message broadcasted by the network includes: when the measurement configuration information from the RRC dedicated message is invalid, if the measurement configuration information carried in the message broadcasted by the network includes a first target frequency the same as a current measurement frequency, preferentially selecting the first target frequency from frequencies included in the measurement configuration information carried in the message broadcasted by the network to perform measurement.

Specifically, a timer is initiated when the UE receives the measurement configuration information indicated by the RRC dedicated message. When a timer expires, it is determined that the measurement configuration information from the RRC dedicated message is invalid.

Herein, when the measurement configuration information from the RRC dedicated message is invalid, the first target frequency is preferentially selected from the N frequencies to perform measurement, thereby ensuring the continuity of measurement.

The step of detecting whether the measurement configuration information from the RRC dedicated message is valid includes: when it is detected that a preset condition is satisfied, determining that the measurement configuration information from the RRC dedicated message is invalid, otherwise, determining that the measurement configuration information from the RRC dedicated message is valid.

The preset condition includes one or more of following conditions:

a timer of the UE expires, where the timer starts timing when the UE receives the RRC dedicated message; or the UE changes an attached cell; or the UE enters the connected state; or the UE performs a public land mobile network (PLMN) reselection.

Further, step 202 of starting, by the UE in a non-connection state, to perform measurements in the one or more frequencies according to the measurement configuration information includes: when the UE moves from a first cell to a second cell, if frequencies acquired from the second cell include a second target frequency the same as a current measurement frequency, preferentially selecting the second target frequency from the frequencies acquired from the second cell to perform measurement.

Herein, when the UE moves from the first cell to the second cell, the second target frequency is preferentially selected from the N measurement frequencies acquired from the second cell to perform measurement, thereby ensuring the continuity of measurement.

Further, the step 203 of reporting, by the UE after the UE enters the connected state from the non-connection state, a measurement result obtained from the measurements includes: notifying, by the UE after the UE enters the connected state from the non-connection state, a base station that the UE has a measurement result to report; and reporting the measurement result after a measurement result reporting indication is received, wherein the measurement result reporting indication is transmitted by the base station according to the notification.

Further, the step of notifying a base station that the UE has a measurement result to report includes: if the measurement result satisfies the reporting condition in the measurement configuration information, notifying the base station that the UE has a measurement result to report.

Further, the step 203 of reporting, by the UE after the UE enters the connected state from the non-connection state, a measurement result obtained from the measurements includes:

notifying, by the UE after the UE enters the connected state from the non-connection state, a base station that the UE has a measurement result to report;

acquiring a measurement result reporting indication transmitted by the base station according to the notification, where the measurement result reporting indication carries report configuration information, and the report configuration information includes target measurement information to be reported and a reporting condition; and reporting the measurement result if the measurement result satisfies the reporting condition in the measurement result reporting indication.

An RRC connection setup complete message or an RRC connection resume complete message is used to notify the base station that the UE has a measurement result to report.

In the non-connection state measurement method according to some embodiments of the present disclosure, UE in a non-connection state starts to perform measurements in frequencies according to measurement configuration information indicated by a base station, and after entering a connected state from the non-connection state, the UE reports a measurement result obtained from the measurements. According to some embodiments of the present disclosure, UE starts to perform measurements in frequencies while the UE is in a non-connection state, and therefore after entering a connected state, the UE can rapidly report a measurement result, so that a base station can configure a secondary cell in advance according to the measurement result, thereby reducing the latency from when the UE enters the connected state to when high-speed data transmission may start.

A specific application process of embodiments of the present disclosure is described below.

First Application Process

Figure 3:
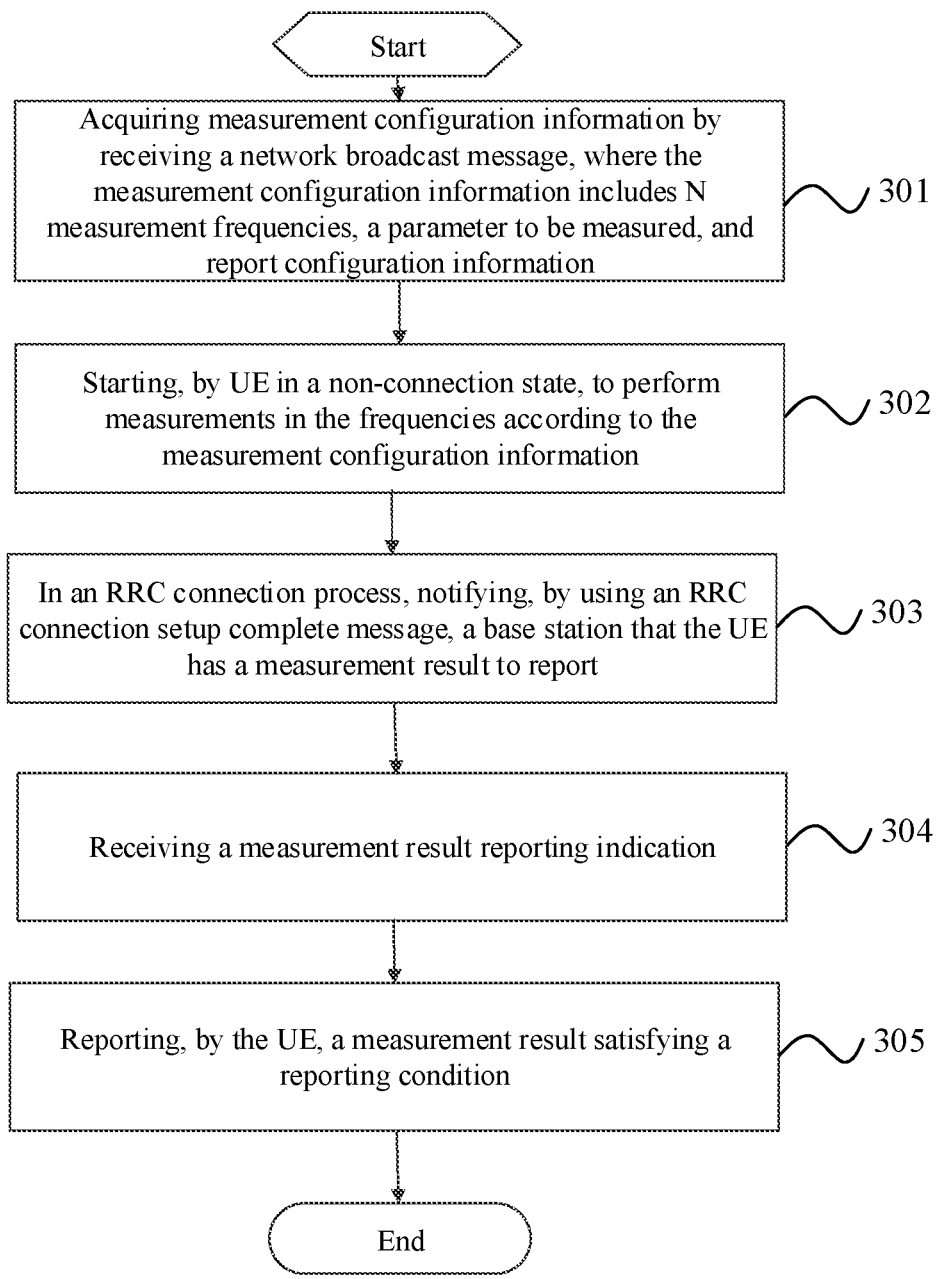
FIG. 3 is a second schematic flowchart of a non-connection state measurement method according to some embodiments of the present disclosure.

FIG. 3 is a second schematic flowchart of a non-connection state measurement method according to some embodiments of the present disclosure. As shown in FIG. 3, the first application process includes the following steps.

Step 301: Acquiring measurement configuration information by receiving a message broadcasted by a network, where the measurement configuration information includes N measurement frequencies, a parameter to be measured, and report configuration information.

N is a positive integer.

Step 302: Starting, by UE in a non-connection state, to perform measurements in the frequencies according to the measurement configuration information.

Step 303: In an RRC connection process, notifying, by using an RRC connection setup complete message, a base station that the UE has a measurement result to report.

Specifically, if the UE has performed measurement and there is a measurement result, the UE indicates that the UE has a measurement result to report.

Preferably, if the UE has not performed measurement or there is no measurement result, the UE indicates that the UE has no measurement result to report.

Preferably, if the UE has performed measurement and a measurement result satisfies a reporting condition, the UE indicates that the UE has a measurement result to report.

Preferably, if the UE has performed measurement and a measurement result does not satisfy a reporting condition, the UE indicates that there is no measurement result.

Preferably, if the UE has performed measurement and a measurement result does not satisfy a reporting condition, the UE indicates that there is a measurement result but the measurement result does not satisfy the reporting condition.

Step 304: Receiving a measurement result reporting indication.

Step 305: Reporting, by the UE, a measurement result satisfying a reporting condition.

Second Application Process

Figure 4:
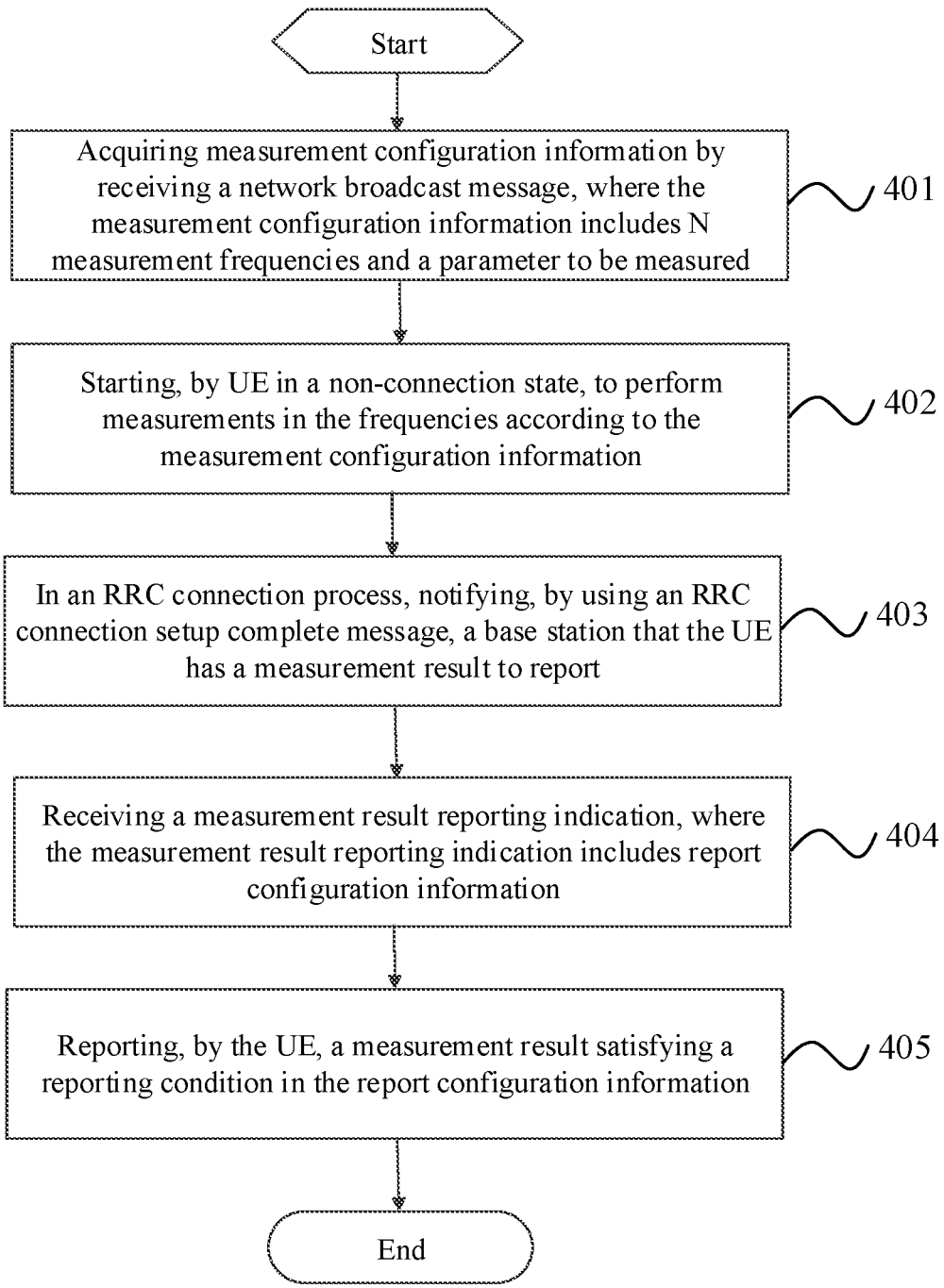
FIG. 4 is a third schematic flowchart of a non-connection state measurement method according to some embodiments of the present disclosure.

FIG. 4 is a third schematic flowchart of a non-connection state measurement method according to some embodiments of the present disclosure. As shown in FIG. 4, the second application process includes the following steps.

Step 401: Acquiring measurement configuration information by receiving a message broadcasted by a network, where the measurement configuration information includes N measurement frequencies and a parameter to be measured.

N is a positive integer.

Step 402: Starting, by UE in a non-connection state, to perform measurements in frequencies according to the measurement configuration information.

Step 403: In an RRC connection process, notifying, by using an RRC connection setup complete message, a base station that the UE has a measurement result to report.

Specifically, if the UE has performed measurement and there is a measurement result, the UE indicates that the UE has a measurement result to report.

Preferably, if the UE has not performed measurement or there is no measurement result, the UE indicates that the UE has no measurement result to report.

Step 404: Receiving a measurement result reporting indication, where the measurement result reporting indication includes report configuration information.

The report configuration information includes target measurement information to be reported and a reporting condition. The reporting condition includes a signal quality threshold for reporting and a time to trigger (TTT).

Step 405: Reporting, by the UE, a measurement result satisfying a reporting condition in the report configuration information.

In addition, if the measurement result does not satisfy the reporting condition in the report configuration information, the UE notifies that there is no valid measurement result.

A main difference between the second application process and the foregoing application process lies in that the measurement configuration information does not include the report configuration information, but instead, the measurement result reporting indication carries the report configuration information.

Third Application Process

Figure 5:
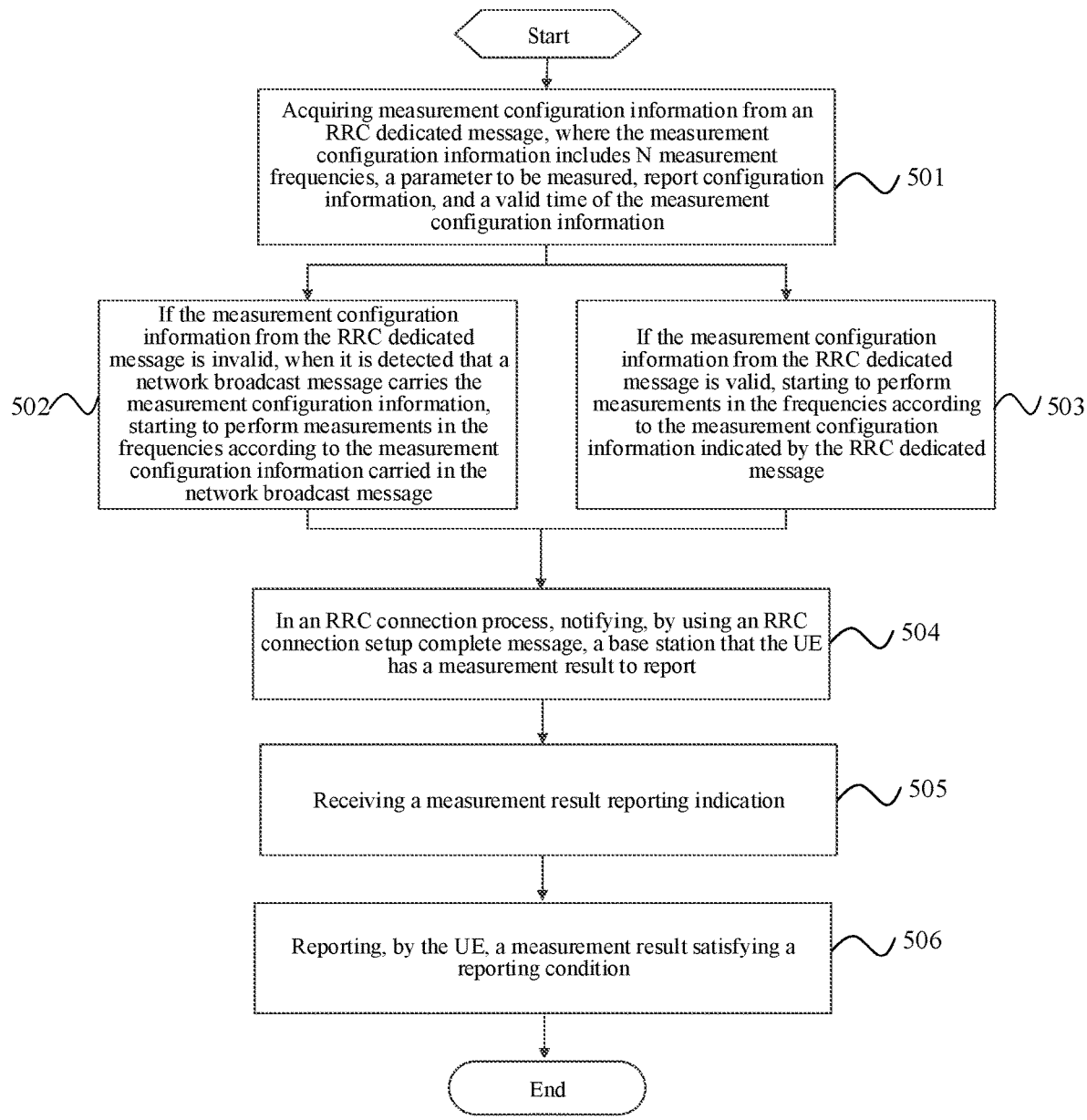
FIG. 5 is a fourth schematic flowchart of a non-connection state measurement method according to some embodiments of the present disclosure.

FIG. 5 is a fourth schematic flowchart of a non-connection state measurement method according to some embodiments of the present disclosure. As shown in FIG. 5, the third application process includes the following steps.

Step 501: Acquiring measurement configuration information from an RRC dedicated message, where the measurement configuration information includes N measurement frequencies, a parameter to be measured, report configuration information, and a valid time of the measurement configuration information.

N is a positive integer. The RRC dedicated message may be an RRC connection release message used by a network to release an RRC connection of UE so that the UE may enter a non-connection state.

After receiving the measurement configuration information, UE starts a timer with a duration equal to the valid time, and when the timer expires, the measurement configuration information is invalid; or when it is detected that the UE changes an attached cell, the measurement configuration information is invalid; or when the UE enters a connected state and performs a PLMN reselection, the measurement configuration information is invalid.

Step 502: If the measurement configuration information from the RRC dedicated message is invalid, when it is detected that a message broadcasted by a network carries the measurement configuration information, starting to perform the measurements according to the measurement configuration information carried in the message broadcasted by the network.

Preferably, when the measurement configuration information from the RRC dedicated message is invalid, if the measurement configuration information carried in the message broadcasted by the network includes a first target frequency the same as a current measurement frequency, the first target frequency is preferentially selected from the N frequencies included in the measurement configuration information carried in the message broadcasted by the network to perform measurement, thereby keeping the continuity of measurement.

Step 503: If the measurement configuration information from the RRC dedicated message is valid, starting to perform the measurements according to the measurement configuration information indicated by the RRC dedicated message.

Step 504: In an RRC connection process, notifying, by using an RRC connection setup complete message, a base station that the UE has a measurement result to report.

The step is the same as the foregoing step 303. Details thereof are not described herein again.

Step 505: Receiving a measurement result reporting indication.

Step 506: Reporting, by UE, a measurement result satisfying a reporting condition.

A main difference between the third application process and the foregoing application processes lies in that the measurement configuration information is acquired from the RRC dedicated message.

Fourth Application Process

Figure 6:
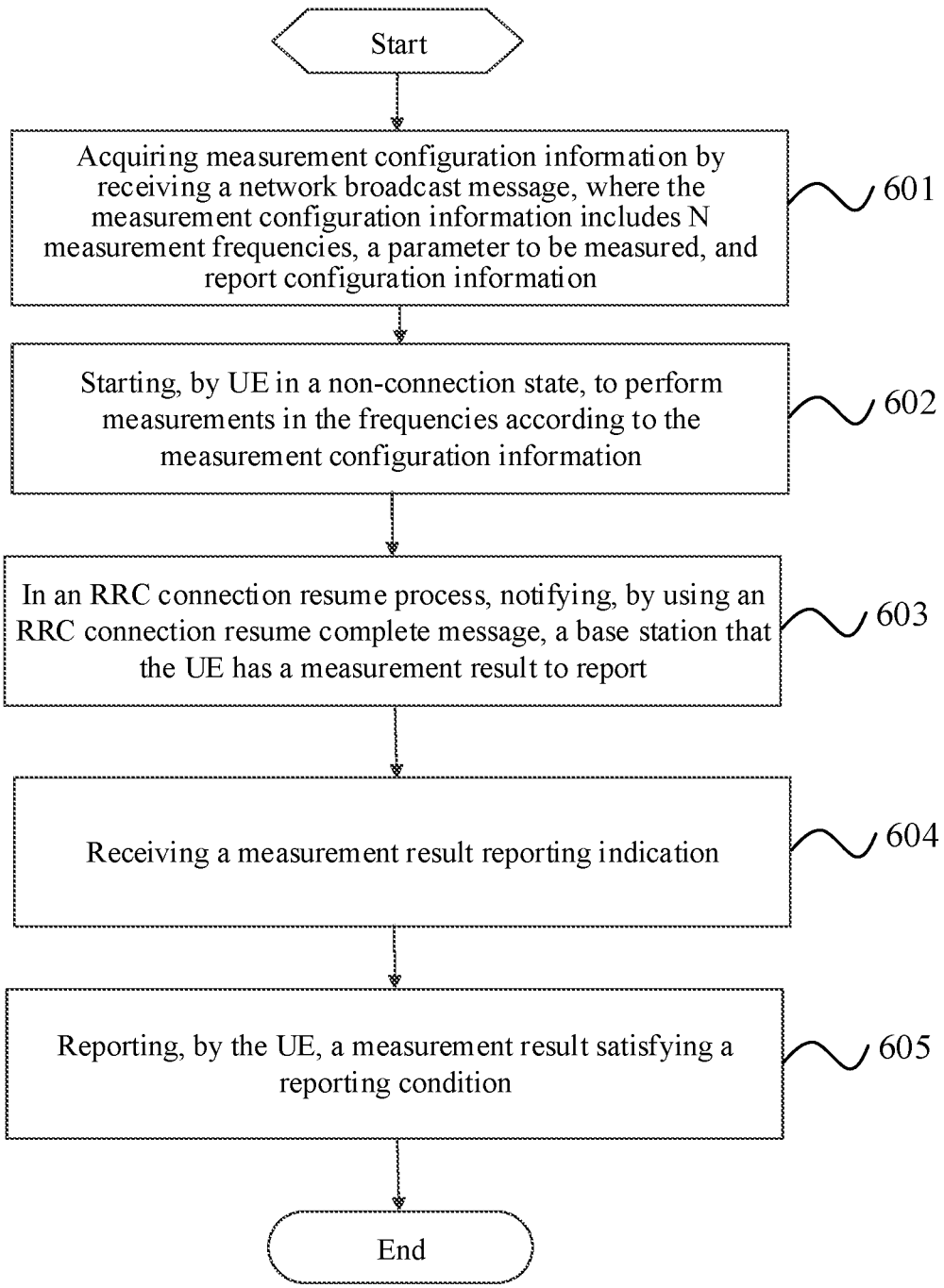
FIG. 6 is a fifth schematic flowchart of a non-connection state measurement method according to some embodiments of the present disclosure.

FIG. 6 is a fifth schematic flowchart of a non-connection state measurement method according to some embodiments of the present disclosure. As shown in FIG. 6, the fourth application process includes the following steps.

Step 601: Acquiring measurement configuration information by receiving a message broadcasted by a network, where the measurement configuration information includes N measurement frequencies, a parameter to be measured, and report configuration information.

Step 602: Starting, by UE in a non-connection state, to perform measurements in frequencies according to the measurement configuration information.

Step 603: In an RRC connection resume process, notifying, by using an RRC connection resume complete message, a base station that the UE has a measurement result to report.

Step 604: Receiving a measurement result reporting indication.

Step 605: Reporting, by the UE, a measurement result satisfying a reporting condition.

A main difference between the fourth application process and the foregoing application processes lies in that the application process is used for an RRC connection resume process.

In addition, in the foregoing four application processes, when it is detected that the UE moves from a first cell to a second cell, if the N frequencies acquired from the second cell include a second target frequency the same as a current measurement frequency, the second target frequency is preferentially selected from the N frequencies acquired from the second cell to perform measurement, to ensure the continuity of measurement. In addition, if UE performs a measurement on a third target frequency in the first cell but decides not to perform a measurement on the third target frequency in the second cell, UE stops the measurement on the third target frequency.

In the non-connection state measurement method in the embodiments of the present disclosure, UE in a non-connection state starts to perform measurements in frequencies according to measurement configuration information indicated by a base station, and after entering a connected state from the non-connection state, the UE reports a measurement result obtained from the measurements. According to some embodiments of the present disclosure, UE starts to perform measurements in frequencies while the UE is in a non-connection state, and therefore after entering a connected state, the UE can rapidly report a measurement result, so that a base station can configure a secondary cell in advance according to the measurement result, thereby reducing the latency from when the UE enters the connected state to when high-speed data transmission may start.

Figure 7:
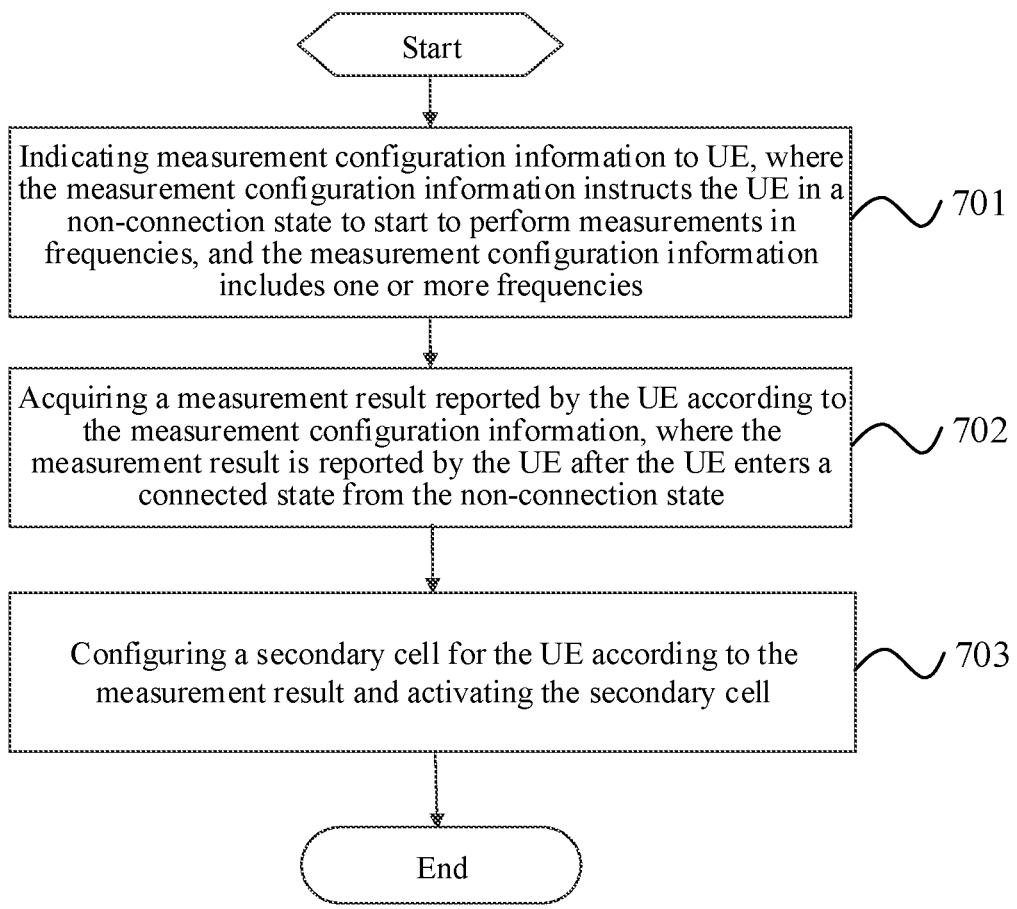
FIG. 7 is a sixth schematic flowchart of a non-connection state measurement method according to some embodiments of the present disclosure.

FIG. 7 is a sixth schematic flowchart of a non-connection state measurement method according to some embodiments of the present disclosure. As shown in FIG. 7, the present disclosure further provides in some embodiments a non-connection state measurement method. The method is applied to a base station and includes the following steps.

Step 701: Indicating measurement configuration information to UE, where the measurement configuration information instructs the UE in a non-connection state to start to perform measurements in frequencies, and the measurement configuration information includes one or more frequencies.

Specifically, a message broadcasted by a network or an RRC dedicated message is used to indicate the measurement configuration information to the UE.

The RRC dedicated message may be an RRC connection release message used by a network to release an RRC connection of UE so that the UE may enter the non-connection state.

Preferably, the measurement configuration information further includes a measurement quantity to be measured, where the measurement quantity to be measured includes at least one of an RSRP or an RSRQ.

Preferably, the measurement configuration information further includes: report configuration information.

The report configuration information includes target measurement information to be reported and a reporting condition, the reporting condition includes a signal quality threshold for reporting and a time to trigger (TTT), and the target measurement information may specifically include at least one of an RSRP or an RSRQ.

The signal quality threshold for reporting refers to that reporting is triggered only when the signal quality is greater than the threshold. The TTT refers to that reporting is triggered only when the signal quality has been greater than the threshold for a particular time.

Step 702: Acquiring a measurement result reported by the UE according to the measurement configuration information, where the measurement result is reported by the UE after the UE enters a connected state from the non-connection state.

The UE in the non-connection state starts to perform the measurements according to the measurement configuration information, and after entering the connected state from the non-connection state, the UE reports the measurement result obtained from the measurements.

Step 703: Configuring a secondary cell for the UE according to the measurement result and activating the secondary cell.

Further, the step 702 of acquiring a measurement result reported by the UE according to the measurement configuration information includes:

if the base station is notified that the UE has a measurement result to report, transmitting a measurement result reporting indication to the UE, where the measurement result reporting indication carries report configuration information, and the report configuration information includes target measurement information to be reported and a reporting condition; and acquiring a measurement result that is reported by the UE according to the measurement result reporting indication and satisfies the reporting condition.

According to some embodiments of the present disclosure, a base station indicates measurement configuration information to UE, so that the UE starts to perform measurements in frequencies while the UE is in a non-connection state, and the UE can rapidly report a measurement result after entering a connected state, as a result, the base station can configure a secondary cell in advance according to the measurement result, thereby reducing the latency from when the UE enters the connected state to when high-speed data transmission may start.

A specific procedure of interaction between a base station and UE according to some embodiments of the present disclosure is described below.

Figure 8:
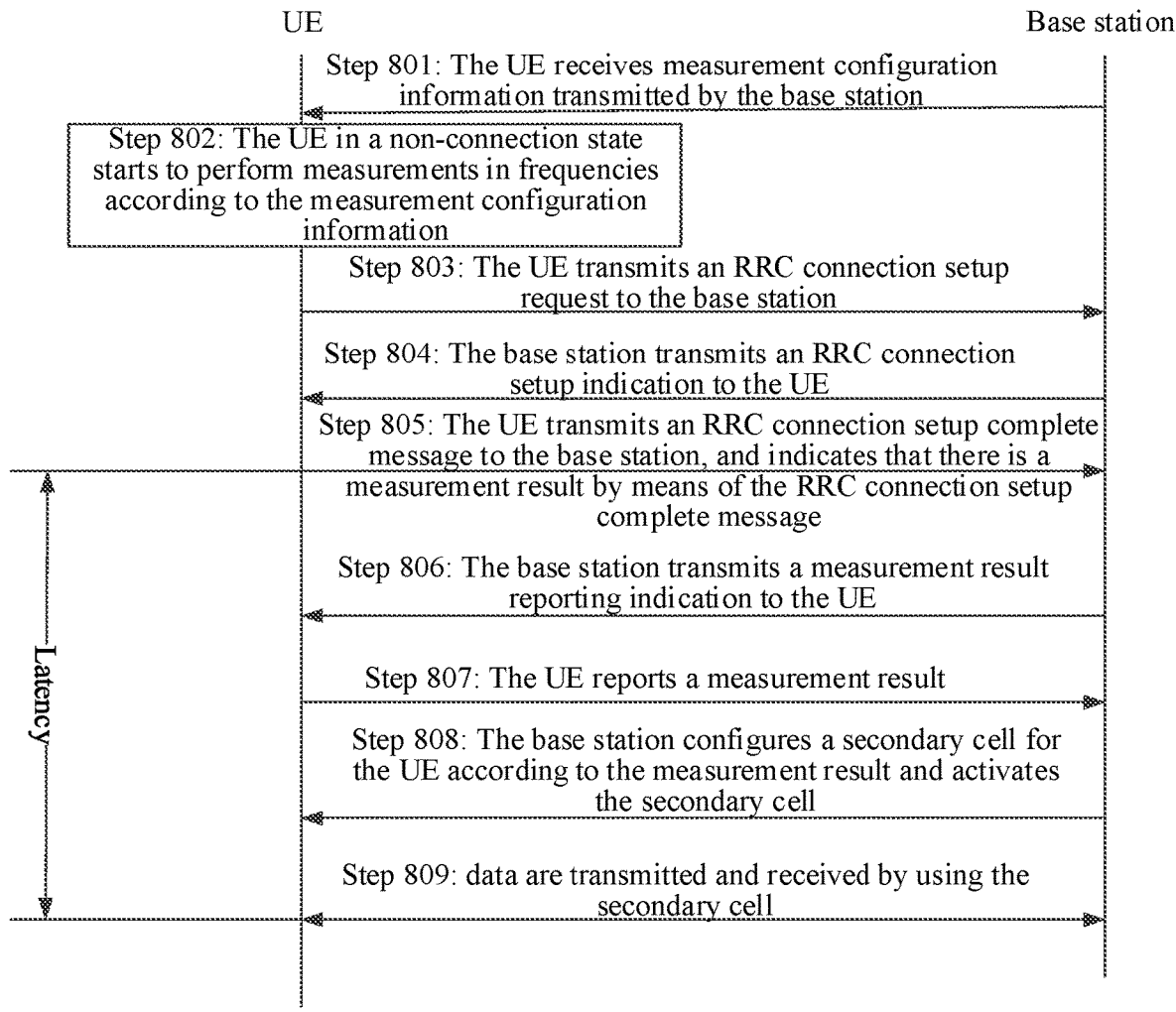
FIG. 8 is a flowchart of interaction between a base station and UE according to some embodiments of the present disclosure.

FIG. 8 is a flowchart of interaction between a base station and UE according to some embodiments of the present disclosure. As shown in FIG. 8, the procedure of interaction includes the following steps.

Step 801: The UE receives measurement configuration information transmitted by the base station.

Step 802: The UE in a non-connection state starts to perform measurements in frequencies according to the measurement configuration information.

Step 803: The UE transmits an RRC connection setup request to the base station.

Step 804: The base station transmits an RRC connection setup indication to the UE.

Step 805: The UE transmits an RRC connection setup complete message to the base station, and indicates that there is a measurement result by means of the RRC connection setup complete message.

Step 806: The base station transmits a measurement result reporting indication to the UE.

Step 807: The UE reports a measurement result.

Step 808: The base station configures a secondary cell for the UE according to the measurement result and activates the secondary cell.

Step 809: data are transmitted and received by using the secondary cell.

It needs to be noted that, there is no limitation as to the order of execution of reporting of a measurement result and activation of a security mode in the embodiments of the present disclosure. That is, a measurement result may be reported before or after or in parallel with activation of a security mode.

As can be seen from FIG. 8, compared with the related art, UE according to some embodiments of the present disclosure starts to perform measurements in frequencies while it is in a non-connection state, and therefore after entering a connected state, the UE can rapidly report a measurement result, so that the base station can configure a secondary cell in advance according to the measurement result, thereby reducing the latency from when the UE enters the connected state to when high-speed data transmission may start.

Figure 9:
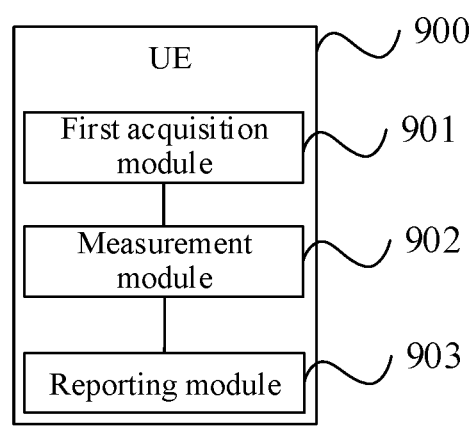
FIG. 9 is a schematic modular diagram of UE according to some embodiments of the present disclosure.

FIG. 9 is a schematic modular diagram of UE according to some embodiments of the present disclosure. As shown in FIG. 9, the present disclosure further provides in some embodiments UE 900, including:

a first acquisition module 901, configured to acquire measurement configuration information, where the measurement configuration information includes one or more frequencies;

a measurement module 902, configured to enable the UE in a non-connection state to start to perform measurements in the one or more frequencies according to the measurement configuration information; and a reporting module 903, configured to report, after it is detected that the UE enters a connected state from the non-connection state, a measurement result obtained from the measurements.

In the UE according to some embodiments of the present disclosure, the measurement configuration information further includes a measurement quantity to be measured, where the measurement quantity to be measured includes at least one of an RSRP or an RSRQ.

In the UE according to some embodiments of the present disclosure, the first acquisition module 901 is configured to acquire the measurement configuration information from a message broadcasted by a network or an RRC dedicated message.

Figure 10:
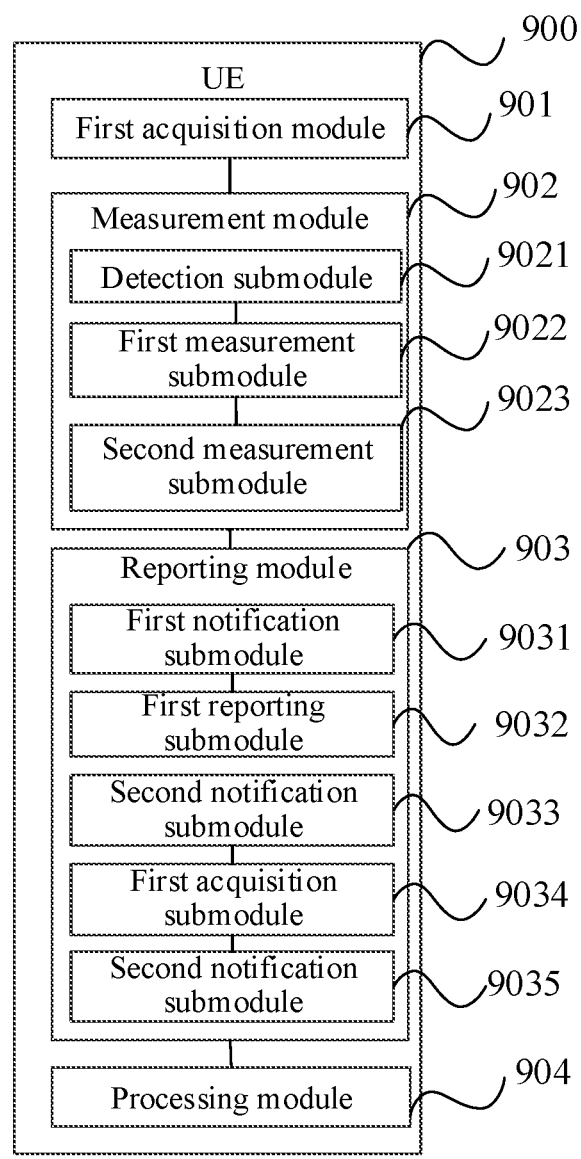
FIG. 10 is another schematic modular diagram of UE according to some embodiments of the present disclosure.

In the UE according to some embodiments of the present disclosure, as shown in FIG. 10, the measurement module 902 includes:

a detection submodule 9021, configured to detect whether the measurement configuration information from the RRC dedicated message is valid;

a first measurement submodule 9022, configured to: if the measurement configuration information from the RRC dedicated message is invalid, when it is detected that the message broadcasted by the network carries the measurement configuration information, start to perform the measurements according to the measurement configuration information carried in the message broadcasted by the network; and a second measurement submodule 9023, configured to: if the measurement configuration information from the RRC dedicated message is valid, start to perform the measurements according to the measurement configuration information indicated by the RRC dedicated message.

In the UE according to some embodiments of the present disclosure, the measurement configuration information further includes a valid time of the measurement configuration information; and the measurement module 902 is configured to: when the measurement configuration information from the RRC dedicated message is invalid, if the measurement configuration information carried in the message broadcasted by the network includes a first target frequency the same as a current measurement frequency, preferentially select the first target frequency from frequencies included in the measurement configuration information carried in the message broadcasted by the network to perform measurement.

In the UE according to some embodiments of the present disclosure, the detection submodule 9021 is configured to: when it is detected that a preset condition is satisfied, determine that the measurement configuration information from the RRC dedicated message is invalid; otherwise, determine that the measurement configuration information from the RRC dedicated message is valid.

The preset condition includes one or more of following conditions:

a timer of the UE expires, where the timer starts timing when the UE receives the RRC dedicated message; or the UE changes an attached cell; or the UE enters the connected state; or the UE performs a PLMN reselection.

In the UE according to some embodiments of the present disclosure, the measurement module 902 is configured to: when it is detected that a measurement trigger condition is satisfied, enable the UE in the non-connection state to start to perform the measurements according to the measurement configuration information.

The measurement trigger condition includes:

a paging message for the UE is received; or a predetermined moment before a paging occasion when a paging message is received is reached, where a time interval between the predetermined moment and the paging occasion is determined in a protocol or configured by a base station; or a start signal for non-connection state measurement is received; or the UE has uplink data to transmit; or the measurement configuration information is received.

In the UE according to some embodiments of the present disclosure, the measurement module 902 is configured to: select a first preset quantity of frequencies from frequencies included in the measurement configuration information to perform measurement; or randomly select a preset quantity of frequencies from frequencies included in the measurement configuration information to perform measurement.

In the UE according to some embodiments of the present disclosure, the measurement module 902 is configured to: when the UE moves from a first cell to a second cell, if frequencies acquired from the second cell include a second target frequency the same as a current measurement frequency, preferentially select the second target frequency from the frequencies acquired from the second cell to perform measurement.

In the UE according to some embodiments of the present disclosure, the measurement configuration information further includes: report configuration information.

The report configuration information includes target measurement information to be reported and a reporting condition.

In the UE according to some embodiments of the present disclosure, the reporting module 903 includes:

a first notification submodule 9031, configured to: after the UE enters the connected state from the non-connection state, notify a base station that the UE has a measurement result to report; and a first reporting submodule 9032, configured to report the measurement result after a measurement result reporting indication is received, where the measurement result reporting indication is transmitted by the base station according to the notification.

In the UE according to some embodiments of the present disclosure, the first notification submodule 9031 is configured to: if the measurement result satisfies the reporting condition in the measurement configuration information, notify the base station that the UE has a measurement result to report.

In the UE according to some embodiments of the present disclosure, the reporting module 903 includes:

a second notification submodule 9033, configured to notify, after the UE enters the connected state from the non-connection state, a base station that the UE has a measurement result to report;

a first acquisition submodule 9034, configured to acquire a measurement result reporting indication transmitted by the base station according to the notification, where the measurement result reporting indication carries report configuration information, and the report configuration information includes target measurement information to be reported and a reporting condition; and a second notification submodule 9035, configured to report the measurement result if the measurement result satisfies the reporting condition in the measurement result reporting indication.

In the UE according to some embodiments of the present disclosure, as shown in FIG. 10, the UE further includes:

a processing module 904, configured to: stop the measurements when an RRC connection complete message or an RRC connection resume complete message is transmitted or the measurement result is reported; or stop the measurements if the measurements are started at a predetermined moment before a paging occasion when a paging message is received, and the UE does not detect that the UE is paged at the paging occasion, where a time interval between the predetermined moment and the paging occasion is determined in a protocol or configured by a base station; or stop the measurements if the measurements are started at a moment T2 before paging message is monitored, and it is detected that the UE is not paged; or stop the measurements after an RRC connection setup fails; or stop the measurements after a connected-state measurement configuration is received; or stop the measurements if a preset time duration has elapsed since the UE started the measurement, where the preset time duration is specified in a protocol or configured by a base station or is equal to a valid time of the measurement configuration information.

The UE according to some embodiments of the present disclosure starts to perform measurements in frequencies according to measurement configuration information indicated by a base station while the UE is in a non-connection state, and after entering a connected state from the non-connection state, the UE reports a measurement result obtained from the measurements. According to some embodiments of the present disclosure, UE starts to perform measurements in frequencies while the UE is in a non-connection state, and therefore after entering a connected state, the UE can rapidly report a measurement result, so that a base station can configure a secondary cell in advance according to the measurement result, thereby reducing the latency from when the UE enters the connected state to when high-speed data transmission may start.

The present disclosure further provides in some embodiments UE, including: a storage, a processor, and a computer program stored in the storage and configured to be executed by the processor, where the processor is configured to execute the computer program to implement various processes in the method embodiment of the foregoing non-connection state measurement method applied to the UE, and can achieve the same technical effects. To avoid repetition, details are not described herein again.

The present disclosure further provides in some embodiments a computer-readable storage medium storing therein a computer program, where the computer program is configured to be executed by a processor to implement various processes in the method embodiment of the foregoing non-connection state measurement method applied to the UE, and can achieve the same technical effects. To avoid repetition, details are not described herein again. The computer-readable storage medium is, for example, a read-only memory (ROM), a random access memory (RAM), a magnetic disk or an optical disc.

Figure 11:
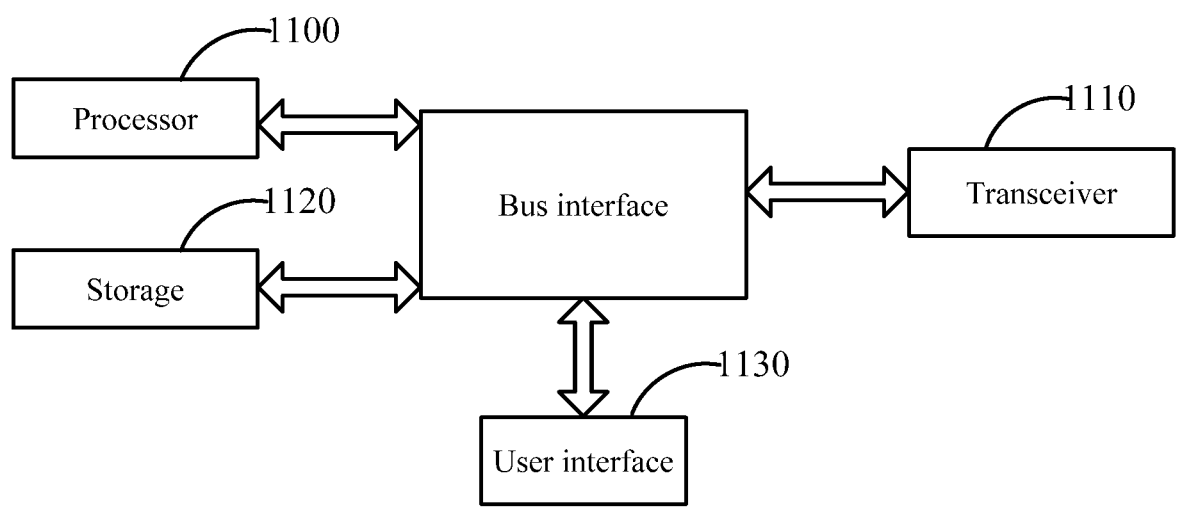
FIG. 11 is a structural block diagram of UE according to some embodiments of the present disclosure.

To better achieve the foregoing objective, as shown in FIG. 11, the present disclosure further provides in some embodiments UE, including a storage 1120, a processor 1100, a transceiver 1110, a user interface 1130, a bus interface, and a computer program stored in the storage 1120 and configured to be executed by the processor 1100. The processor 1100 is configured to read the program in the storage 1120 to perform the following process:

acquiring measurement configuration information, where the measurement configuration information includes one or more frequencies;

enabling the UE in a non-connection state to start to perform measurements in the one or more frequencies according to the measurement configuration information; and reporting, after the UE enters a connected state from the non-connection state, a measurement result obtained from the measurements.

In FIG. 11, a bus architecture may include any quantity of interconnected buses and bridges. Specifically, various circuits such as one or more processors represented by the processor 1100 and a storage represented by the storage 1120 are linked together. The bus architecture may also link various other circuits such as peripherals, voltage regulators, and power management circuits, which are well known in the art, and therefore are not further described herein. The bus interface provides an interface. The transceiver 1110 may include a plurality of elements, that is, a transmitter and a transceiver, to provide units for communicating with various other apparatuses over a transmission medium. For different user devices, the user interface 1130 may be an interface capable of externally/internally connecting desired devices, including, but not limited to, a keypad, a display, a speaker, a microphone, and a joystick.

The processor 1100 is responsible for managing the bus architecture and general processing. The storage 1120 can store data used by the processor 1100 while performing operations.

Optionally, the measurement configuration information further includes a measurement quantity to be measured.

The measurement quantity to be measured includes at least one of an RSRP or an RSRQ.

Optionally, the processor 1100 reads the program in the storage 1120 to perform the following process: acquiring the measurement configuration information from a message broadcasted by a network or an RRC dedicated message.

Optionally, when the measurement configuration information is acquired from the RRC dedicated message, the processor 1100 reads the program in the storage 1120 to further perform the following process:

detecting whether the measurement configuration information from the RRC dedicated message is valid;

if the measurement configuration information from the RRC dedicated message is invalid, when it is detected that the message broadcasted by the network carries the measurement configuration information, starting to perform the measurements according to the measurement configuration information carried in the message broadcasted by the network; and if the measurement configuration information from the RRC dedicated message is valid, starting to perform the measurements according to the measurement configuration information indicated by the RRC dedicated message.

Optionally, the measurement configuration information further includes a valid time of the measurement configuration information.

Optionally, the processor 1100 reads the program in the storage 1120 to further perform the following process: when the measurement configuration information from the RRC dedicated message is invalid, if the measurement configuration information carried in the message broadcasted by the network includes a first target frequency the same as a current measurement frequency, preferentially selecting the first target frequency from frequencies included in the measurement configuration information carried in the message broadcasted by the network to perform measurement.

Optionally, the processor 1100 reads the program in the storage 1120 to further perform the following process: when it is detected that a preset condition is satisfied, determining that the measurement configuration information from the RRC dedicated message is invalid; otherwise, determining that the measurement configuration information from the RRC dedicated message is valid.

The preset condition includes one or more of following conditions:

a timer of the UE expires, where the timer starts timing when the UE receives the RRC dedicated message; or the UE changes an attached cell; or the UE enters the connected state; or the UE performs a PLMN reselection.

Optionally, the processor 1100 reads the program in the storage 1120 to further perform the following process: when it is detected that a measurement trigger condition is satisfied, enabling the UE in the non-connection state to start to perform the measurements according to the measurement configuration information.

The measurement trigger condition includes:

a paging message for the UE is received; or a predetermined moment before a paging occasion when a paging message is received is reached, where a time interval between the predetermined moment and the paging occasion is determined in a protocol or configured by a base station; or a start signal for non-connection state measurement is received; or the UE has uplink data to transmit; or the measurement configuration information is received.

Optionally, the processor 1100 reads the program in the storage 1120 to further perform the following process:

selecting a first preset quantity of frequencies from frequencies included in the measurement configuration information to perform measurement; or randomly selecting a preset quantity of frequencies from frequencies included in the measurement configuration information to perform measurement.

Optionally, the processor 1100 reads the program in the storage 1120 to further perform the following process: when the UE moves from a first cell to a second cell, if frequencies acquired from the second cell include a second target frequency the same as a current measurement frequency, preferentially selecting the second target frequency from the frequencies acquired from the second cell to perform measurement.

Optionally, the measurement configuration information further includes: reporting configuration information, where the report configuration information includes target measurement information to be reported and a reporting condition.

Optionally, the processor 1100 reads the program in the storage 1120 to further perform the following process:

notifying, after the UE enters the connected state from the non-connection state, a base station that the UE has a measurement result to report;

reporting the measurement result after a measurement result reporting indication is received, where the measurement result reporting indication is transmitted by the base station according to the notification.

Optionally, the processor 1100 reads the program in the storage 1120 to further perform the following process: if the measurement result satisfies the reporting condition in the measurement configuration information, notifying a base station that the UE has a measurement result to report.

Optionally, the processor 1100 reads the program in the storage 1120 to further perform the following process:

notifying, after the UE enters the connected state from the non-connection state, a base station that the UE has a measurement result to report;

acquiring a measurement result reporting indication transmitted by the base station according to the notification, where the measurement result reporting indication carries report configuration information, and the report configuration information includes target measurement information to be reported and a reporting condition; and reporting the measurement result if the measurement result satisfies the reporting condition in the measurement result reporting indication.

Optionally, the processor 1100 reads the program in the storage 1120 to further perform the following process:

stopping the measurements when an RRC connection complete message or an RRC connection resume complete message is transmitted or the measurement result is reported; or stopping the measurements after an RRC connection complete message or an RRC connection resume complete message has been transmitted or the measurement result has been reported; or stopping the measurements if the measurements are started at a predetermined moment before a paging occasion when a paging message is received, and the UE does not detect that the UE is paged at the paging occasion, where a time interval between the predetermined moment and the paging occasion is determined in a protocol or configured by a base station; or stopping the measurements after an RRC connection setup fails; or stopping the measurements after a connected-state measurement configuration is received; or stopping the measurements if a preset time duration has elapsed since the UE started the measurement, where the preset time duration is specified in a protocol or configured by a base station or is equal to a valid time of the measurement configuration information.

Figure 12:
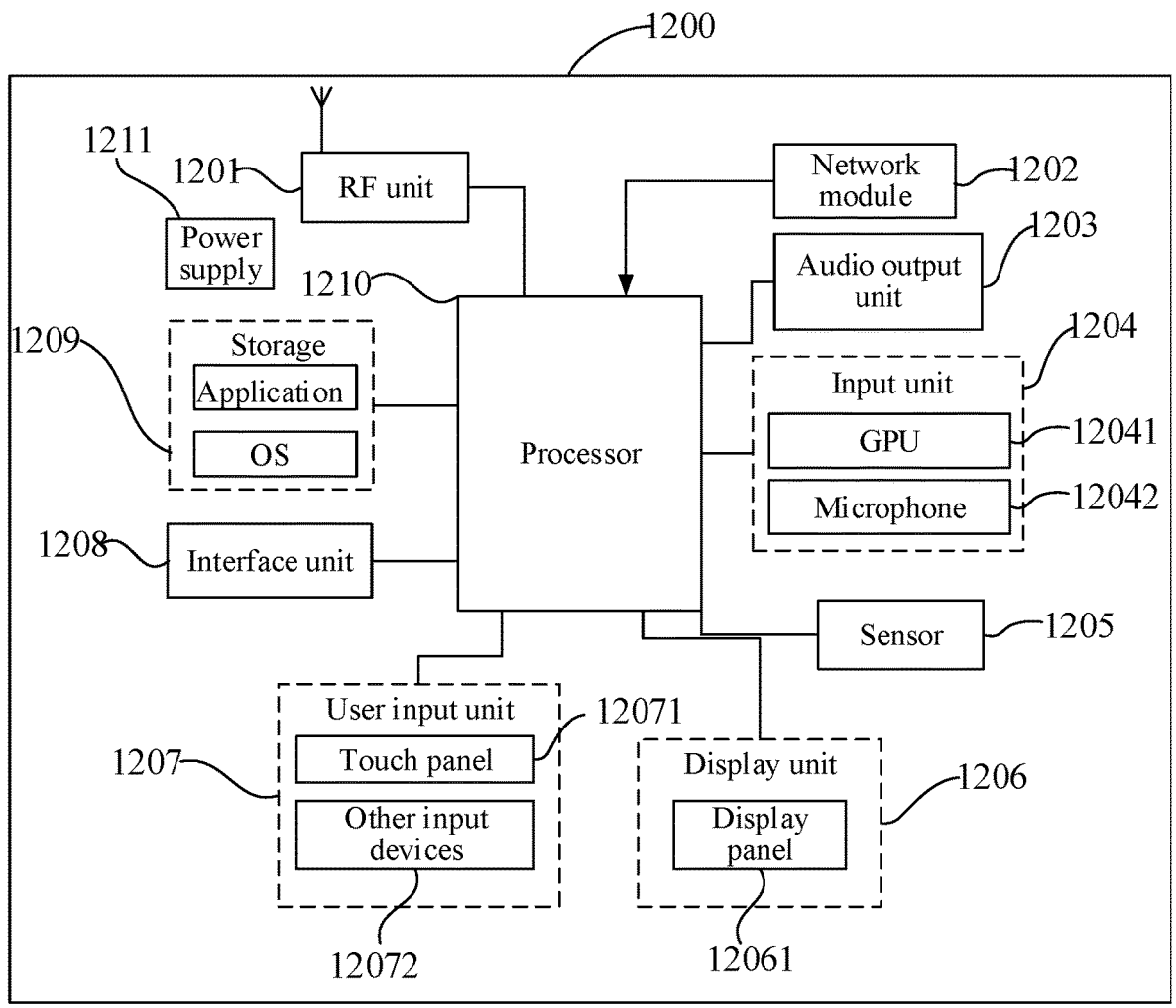
FIG. 12 is another structural block diagram of UE according to some embodiments of the present disclosure.

FIG. 12 is a schematic hardware structural diagram of UE for implementing various embodiments of the present disclosure. UE 1200 includes, but is not limited to, a radio frequency (RF) unit 1201, a network module 1202, an audio output unit 1203, an input unit 1204, a sensor 1205, a display unit 1206, a user input unit 1207, an interface unit 1208, a storage 1209, a processor 1210, and a power supply 1211, among other components. It may be understood by those skilled in the art that the UE structure shown in FIG. 5 does not constitute a limitation on the UE, and the UE may include more or fewer components than those shown, or some components may be combined, or different component arrangements are used. According to some embodiments of the present disclosure, the UE includes, but is not limited to, a mobile phone, a tablet computer, a notebook computer, a palmtop computer, an in-vehicle terminal, a wearable device, and a pedometer.

The processor 1210 is configured to: acquire measurement configuration information, where the measurement configuration information includes one or more frequencies; enable the UE in a non-connection state to start to perform measurements in frequencies according to the measurement configuration information; and report, after the UE enters a connected state from the non-connection state, a measurement result obtained from the measurements.

In the foregoing technical solutions in some embodiments of the present disclosure, UE in a non-connection state starts to perform measurements in frequencies according to measurement configuration information indicated by a base station, and after entering a connected state from the non-connection state, the UE reports a measurement result obtained from the measurements. According to some embodiments of the present disclosure, UE starts to perform measurements in frequencies while the UE is in a non-connection state, and therefore after entering a connected state, the UE can rapidly report a measurement result, so that a base station can configure a secondary cell in advance according to the measurement result, thereby reducing the latency from when the UE enters the connected state to when high-speed data transmission may start.

It should be understood that in some embodiments of the present disclosure, the RF unit 1201 may be configured to receive and transmit signals during receiving or transmitting information or during a call. Specifically, the RF unit 1201 may be configured to receive DL data from a base station to be processed by the processor 1210, and additionally transmit UL data to the base station. Generally, the RF unit 1201 includes, but is not limited to, an antenna, at least one amplifier, a transceiver, a coupler, a low noise amplifier, a duplexer, and the like. In addition, the RF unit 1201 can also communicate with a network or other devices through a wireless communication system.

The UE provides a user with wireless broadband Internet access through the network module 1202, for example, to enable the user to receive and transmit emails, browse web pages, access streaming media, and the like.

The audio output unit 1203 may convert audio data received by the RF unit 1201 or the network module 1202 or stored in the memory 1209 into an audio signal and output the audio signal as sound. Moreover, the audio output unit 1203 can also provide audio output associated with a specific function performed by the UE 1200 (for example, incoming call ringtone, message received ringtone and the like). The audio output unit 1203 includes a speaker, a buzzer, a receiver, and the like.

The input unit 1204 is configured to receive an audio or video signal. The input unit 1204 may include a graphics processing unit (GPU) 12041 and a microphone 12042, and the GPU 12041 processes image data of a still picture or video obtained by an image capturing device (such as a camera) in a video capturing mode or an image capturing mode. Processed image frames can be displayed on the display unit 1206. The image frames processed by the GPU 12041 may be stored in the storage 1209 (or other storage medium) or transmitted via the RF unit 1201 or the network module 1202. The microphone 12042 can receive sound and can process such sound into audio data. In a telephone call mode, the processed audio data can be converted into an output format that can be transmitted to a mobile communication base station via the RF unit 1201.

The UE 1200 further includes at least one sensor 1205 such as a light sensor, a motion sensor, and other sensors. Specifically, the light sensor includes an ambient light sensor and a proximity sensor. The ambient light sensor can adjust the brightness of the display panel 12061 according to the intensity of the ambient light, and the proximity sensor can turn off the display panel 12061 and/or backlight when the UE 1200 is moved near the ear. As a kind of motion sensor, an accelerometer sensor can detect the magnitude of acceleration in various directions (usually three axes). When the accelerometer sensor is stationary, the accelerometer sensor can detect the magnitude and direction of gravity. The accelerometer sensor can be used in posture identification of the mobile terminal (e.g., switch between portrait and landscape modes, related games, magnetometer posture calibration), vibration identification related function (such as pedometer, tapping), and the like. The sensor 1205 may further include a fingerprint sensor, a pressure sensor, an iris sensor, a molecular sensor, a gyroscope, a barometer, a hygrometer, a thermometer, an infrared sensor, and the like. Details are not described herein.

The display unit 1206 is configured to display information input by the user or information provided to the user. The display unit 1206 may include a display panel 12061. The display panel 12061 may be configured in the form of a liquid-crystal display (LCD), an organic light-emitting diode (OLED) or the like.

The user input unit 1207 may be configured to receive input numeric or character information and to generate key signal inputs related to user settings and functional control of the UE. Specifically, the user input unit 1207 includes a touch panel 12071 and other input devices 12072. The touch panel 12071, also referred to as a touch screen, can collect a touch operation (for example, an operation of the user on the touch panel 12071 or near the touch panel 12071 using a finger, a stylus or any appropriate object or accessory) of the user on or near the touch panel 12071. The touch panel 12071 may include two parts, namely, a touch detection device and a touch controller. The touch detection device detects the position touched by the user, detects a signal brought by the touch operation, and transmits the signal to the touch controller. The touch controller receives touch information from the touch detection device, converts the touch information into contact coordinates, and sends the contact coordinates to the processor 1210. The touch controller receives commands from the processor 1210 and executes the commands. In addition, the touch panel 12071 may be implemented in various forms such as resistive, capacitive, infrared, and surface acoustic wave. In addition to the touch panel 12071, the user input unit 1207 may further include other input devices 12072. Specifically, other input devices 12072 may include, but are not limited to, a physical keyboard, functional keys (for example, a volume control button, and a switch button), a trackball, a mouse, and a joystick. Details are not described herein.

Further, the touch panel 12071 may be overlaid on the display panel 12061. When the touch panel 12071 detects a touch operation on or near the touch panel 12071, the touch panel 12071 transmits the detected signal to the processor 1210 to determine the type of a touch event. The processor 1210 then provides a corresponding visual output on the display panel 12061 according to the type of the touch event. Although in FIG. 12, the touch panel 12071 and the display panel 12061 are used as two independent components to implement the input and output functions of the UE, the touch panel 12071 and the display panel 12061 may be integrated to implement the input and output functions of the UE in some embodiments, which is not limited herein.

The interface unit 1208 is an interface by which an external device is connected to the UE 1200. For example, the external device may include a wired or wireless headset port, an external power (or battery charger) port, a wired or wireless data port, a memory card port, a port for connecting a device having an identification module, an audio input/output (I/O) port, a video I/O port, a headphone port, and the like. The interface unit 1208 may be configured to receive input (for example, data information, and power) from the external device and transmit the received input to one or more components within the UE 1200 or may be configured to transfer data between the UE 1200 and the external device.

The storage 1209 may be configured to store software programs as well as various data. The storage 1209 may mainly include a program storage area and a data storage area. The program storage area may store an operating system, an application required for at least one function (for example, a sound playback function, and an image displaying function), and the like. The data storage area may store data (for example, audio data, and a phone book) created according to the use of a mobile phone. Moreover, the storage 1209 may include a high-speed random access memory (RAM), and may further include a non-volatile storage, for example, at least one magnetic disk storage device, flash memory device, or other volatile solid state storage device.

The processor 1210 is a control center of the UE, is connected to various portions of the entire terminal using various interfaces and lines, and performs various functions of the UE and processes data by running or executing software programs and/or modules stored in the storage 1209 and invoking data stored in the storage 1209, so as to monitor the UE as a whole. The processor 1210 may include one or more processing units. Preferably, the processor 1210 may integrate an application processor and a modem. The application processor mainly processes an operating system, a user interface, an application, and the like. The modem mainly processes wireless communication. It may be understood that the modem may not be integrated into the processor 1210.

The UE 1200 may further include a power supply 1211 (for example, a battery) for powering various components. Preferably, the power supply 1211 may be logically coupled to the processor 1210 through a power management system, so as to implement charging management, discharging management, power consumption management, and other functions through the power management system.

In addition, the UE 1200 includes some functional modules not shown, which are not described herein again.

Figure 13:
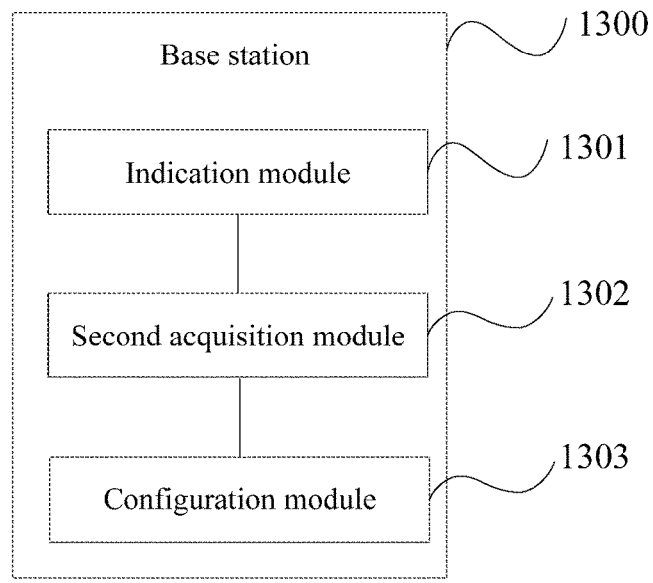
FIG. 13 is a schematic modular diagram of a base station according to some embodiments of the present disclosure.

As shown in FIG. 13, the present disclosure further provides in some embodiments a base station 1300, including:

an indication module 1301, configured to indicate measurement configuration information to UE, where the measurement configuration information instructs the UE in a non-connection state to start to perform measurements in frequencies, and the measurement configuration information includes one or more frequencies;

a second acquisition module 1302, configured to acquire a measurement result reported by the UE according to the measurement configuration information, where the measurement result is reported by the UE after the UE enters a connected state from the non-connection state; and a configuration module 1303, configured to configure a secondary cell for the UE according to the measurement result and activate the secondary cell.

In the base station according to some embodiments of the present disclosure, the measurement configuration information further includes a measurement quantity to be measured.

The measurement quantity to be measured includes at least one of an RSRP or an RSRQ.

In the base station according to some embodiments of the present disclosure, the measurement configuration information further includes report configuration information.

The report configuration information includes target measurement information to be reported and a reporting condition.

In the base station according to some embodiments of the present disclosure, the second acquisition module 1302 includes:

a transmission submodule, configured to: if the base station is notified that the UE has a measurement result to report, transmit a measurement result reporting indication to the UE, where the measurement result reporting indication carries report configuration information, and the report configuration information includes target measurement information to be reported and a reporting condition; and a second acquisition submodule, configured to acquire a measurement result that is reported by the UE according to the measurement result reporting indication and satisfies the reporting condition.

The base station according to some embodiments of the present disclosure indicates measurement configuration information to UE, so that the UE starts to perform measurements in frequencies while the UE is in a non-connection state, and the UE can rapidly report a measurement result after entering a connected state, as a result, the base station can configure a secondary cell in advance according to the measurement result, thereby reducing the latency from when the UE enters the connected state to when high-speed data transmission may start.

The present disclosure further provides in some embodiments a base station, including: a storage, a processor, and a computer program stored in the storage and configured to be executed by the processor, where the processor is configured to execute the computer program to implement various processes in the method embodiment of the foregoing non-connection state measurement method applied to a base station and can achieve the same technical effects. To avoid repetition, details are not described herein again.

The present disclosure further provides in some embodiments a computer-readable storage medium, storing therein a computer program, where the computer program is configured to be executed by a processor to implement various processes in the method embodiment of the foregoing non-connection state measurement method applied to a base station and can achieve the same technical effects. To avoid repetition, details are not described herein again. The computer-readable storage medium is, for example, a ROM, a RAM, a magnetic disk, an optical disc, or the like.

Figure 14:
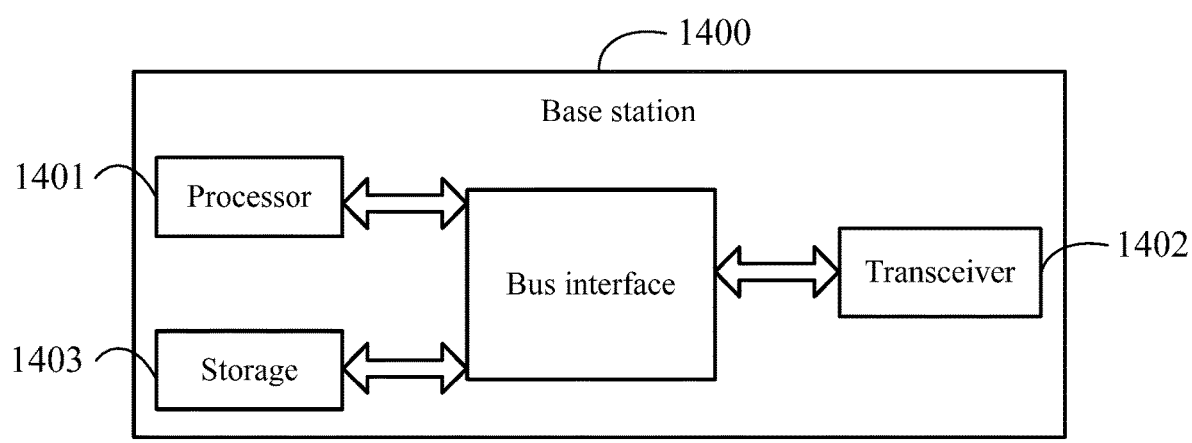
FIG. 14 is a structural block diagram of a base station according to some embodiments of the present disclosure.

As shown in FIG. 14, the present disclosure further provides in some embodiments a base station 1400, including a processor 1401, a transceiver 1402, a storage 1403, a user interface 1404, and a bus interface.

The processor 1401 is configured to read the program in the storage 1403 to perform the following process: indicating measurement configuration information to UE, where the measurement configuration information instructs the UE in a non-connection state to start to perform measurements in frequencies, and the measurement configuration information includes one or more frequencies; acquiring a measurement result reported by the UE according to the measurement configuration information, where the measurement result is reported by the UE after the UE enters a connected state from the non-connection state; and configuring a secondary cell for the UE according to the measurement result and activating the secondary cell.

In FIG. 14, a bus architecture may include any quantity of interconnected buses and bridges. Specifically, various circuits such as one or more processors represented by the processor 1401 and a storage represented by the storage 1403 are linked together. The bus architecture may also link various other circuits such as peripherals, voltage regulators, and power management circuits, which are well known in the art, and therefore are not further described herein. The bus interface provides an interface. The transceiver 1402 may include a plurality of elements, that is, a transmitter and a receiver, to provide units for communicating with various other apparatuses over a transmission medium.

The processor 1401 is responsible for managing the bus architecture and general processing. The storage 1403 can store data used by the processor 1401 while performing operations.

Optionally, the measurement configuration information further includes a measurement quantity to be measured, where the measurement quantity to be measured includes at least one of an RSRP or an RSRQ.

Optionally, the measurement configuration information further includes report configuration information.

The report configuration information includes target measurement information to be reported and a reporting condition.

Optionally, the processor 1401 is configured to read the program in the storage 1403 to further perform the following process:

if the base station is notified that the UE has a measurement result to report, transmitting a measurement result reporting indication to the UE, where the measurement result reporting indication carries report configuration information, and the report configuration information includes target measurement information to be reported and a reporting condition; and acquiring a measurement result that is reported by the UE according to the measurement result reporting indication and satisfies the reporting condition.

It should be noted that the terms "include", "have", or any variation thereof used herein are intended to cover a non-exclusive inclusion, such that a process, a method, an article, or a device that includes a list of elements not only includes the list of elements, but also may include other elements not expressly listed or include elements inherent to the process, the method, the article, or the device. In case that there is no further limitation, an element preceded by "includes or including" does not preclude existence of additional identical elements in the process, the method, the article, or the device including the element.

From the foregoing description of the embodiments, a person skilled in the art will clearly appreciate that the method according to the embodiments may be implemented not only by software in conjunction with necessary generic hardware platform, but also by hardware, although the former will be preferred in most cases. Based on such an understanding, essential parts, or parts contributing to the related art, of the technical solution of the present disclosure may be implemented in form of a software product. The software product is stored in a storage medium (e.g., an ROM/RAM, a magnetic disk and an optical disc) and includes several instructions configured to be executed by UE (such as a handset, a computer, a server, an air conditioner or a network device) to perform the method according to the embodiments of the present disclosure.

The embodiments of the present disclosure are described above with reference to the accompanying drawings. However, the present disclosure is not limited to the foregoing specific implementations. The foregoing specific implementations are merely illustrative rather than limitative. In light of the teachings of the present disclosure, a person of ordinary skill in the art may further make various forms without departing from the spirit of the present disclosure and the scope of the claims, and these forms all fall within the scope of the present disclosure.

What is claimed is:

1. A non-connection state measurement method, applied to user equipment (UE), comprising: acquiring measurement configuration information, wherein the measurement configuration information comprises one or more frequencies; starting, by the UE in a non-connection state, to perform measurements on the one or more frequencies according to the measurement configuration information; and reporting, by the UE after the UE enters a connected state from the non-connection state, a measurement result obtained from the measurement, wherein the method further comprises: stopping the measurements when a radio resource control (RRC) connection setup complete message or an RRC connection resume complete message is transmitted or the measurement result is reported; or stopping the measurements after an RRC connection setup complete message or an RRC connection resume complete message has been transmitted or the measurement result has been reported; and stopping the measurements if the measurements are started at a predetermined moment before a paging occasion when a paging message is received, and the UE does not detect that the UE is paged at the paging occasion, wherein a time interval between the predetermined moment and the paging occasion is determined in a protocol or configured by a base station; and stopping the measurements after an RRC connection setup fails; or stopping the measurements after a connected-state measurement configuration is received; and stopping the measurements if a preset time duration has elapsed since the UE started the measurement, wherein the preset time duration is specified in a protocol or configured by a base station or is equal to a valid time of the measurement configuration information.

2. The non-connection state measurement method according to claim 1, wherein the measurement configuration information further comprises a measurement quantity to be measured,
the measurement quantity to be measured comprises at least one of a reference signal received power (RSRP) or a reference signal received quality (RSRQ).

3. The non-connection state measurement method according to claim 1, wherein the acquiring measurement configuration information comprises:
acquiring the measurement configuration information from a message broadcasted by a network or a radio resource control (RRC) dedicated message.

4. The non-connection state measurement method according to claim 3, wherein, when the measurement configuration information is acquired from the RRC dedicated message, the starting, by the UE in a non-connection state, to perform measurements on the one or more frequencies according to the measurement configuration information comprises:
detecting whether the measurement configuration information from the RRC dedicated message is valid;
if the measurement configuration information from the RRC dedicated message is valid, starting to perform the measurements according to the measurement configuration information indicated by the RRC dedicated message.

5. The non-connection state measurement method according to claim 4, wherein the detecting whether the measurement configuration information from the RRC dedicated message is valid comprises:
when it is detected that a preset condition is satisfied, determining that the measurement configuration information from the RRC dedicated message is invalid; otherwise, determining that the measurement configuration information from the RRC dedicated message is valid, wherein
the preset condition comprises one or more of following conditions:
a timer of the UE expires, wherein the timer starts when the UE receives the RRC dedicated message; or
the UE changes an attached cell; or
the UE enters the connected state; or
the UE performs a public land mobile network (PLMN) reselection.

6. The non-connection state measurement method according to claim 4, wherein, if the measurement configuration information from the RRC dedicated message is invalid, when it is detected that the message broadcasted by the network carries the measurement configuration information, starting to perform the measurements according to the measurement configuration information carried in the message broadcasted by the network.

7. The non-connection state measurement method according to claim 1, wherein the starting, by the UE in a non-connection state, to perform measurements on the one or more frequencies according to the measurement configuration information comprises:
when it is detected that a measurement trigger condition is satisfied, starting, by the UE in the non-connection state, to perform the measurements according to the measurement configuration information, wherein
the measurement trigger condition comprises:
a paging message for the UE is received; or
a predetermined moment before a paging occasion when a paging message is received is reached, wherein a time interval between the predetermined moment and the paging occasion is determined in a protocol or configured by a base station; or
a start signal for non-connection state measurement is received; or
the UE has uplink data to transmit; or
the measurement configuration information is received.

8. The non-connection state measurement method according to claim 1, wherein the starting, by the UE in a non-connection state, to perform measurements on the one or more frequencies according to the measurement configuration information comprises:
selecting a first preset quantity of frequencies from frequencies comprised in the measurement configuration information to perform measurement; or
randomly selecting a preset quantity of frequencies from frequencies comprised in the measurement configuration information to perform measurement.

9. The non-connection state measurement method according to claim 1, wherein the starting, by the UE in a non-connection state, to perform measurements on the one or more frequencies according to the measurement configuration information comprises:
when the UE moves from a first cell to a second cell, if frequencies acquired from the second cell comprise a second target frequency the same as a current measurement frequency, preferentially selecting the second target frequency from the frequencies acquired from the second cell to perform measurement.

10. The non-connection state measurement method according to claim 1, wherein the measurement configuration information further comprises report configuration information, and the report configuration information comprises target measurement information to be reported and a reporting condition.

11. The non-connection state measurement method according to claim 10, wherein the reporting, by the UE after the UE enters a connected state from the non-connection state, a measurement result obtained from the measurements comprises:
notifying, by the UE after the UE enters the connected state from the non-connection state, a base station that the UE has a measurement result to report; and
reporting the measurement result after a measurement result reporting indication is received, wherein the measurement result reporting indication is transmitted by the base station according to the notification.

12. The non-connection state measurement method according to claim 11, wherein the notifying a base station that the UE has a measurement result to report comprises:
if the measurement result satisfies the reporting condition in the measurement configuration information, notifying the base station that the UE has the measurement result to report.

13. The non-connection state measurement method according to claim 1, wherein the reporting, by the UE after the UE enters a connected state from the non-connection state, a measurement result obtained from the measurements comprises:
notifying, by the UE after the UE enters the connected state from the non-connection state, a base station that the UE has a measurement result to report;
acquiring a measurement result reporting indication transmitted by the base station according to the notification, wherein the measurement result reporting indication carries report configuration information, and the report configuration information comprises target measurement information to be reported and a reporting condition; and
reporting the measurement result if the measurement result satisfies the reporting condition in the measurement result reporting indication.

14. User equipment (UE), comprising: a storage, a processor, and a computer program stored in the storage and configured to be executed by the processor, wherein the processor is configured to execute the computer program to implement a non-connection state measurement method, and the non-connection state measurement method comprises: acquiring measurement configuration information, wherein the measurement configuration information comprises one or more frequencies; starting, by the UE in a non-connection state, to perform measurements on the one or more frequencies according to the measurement configuration information; and reporting, by the UE after the UE enters a connected state from the non-connection state, a measurement result obtained from the measurement; wherein the method further comprises: stopping the measurements when a radio resource control (RRC) connection setup complete message or an RRC connection resume complete message is transmitted or the measurement result is reported; or stopping the measurements after an RRC connection setup complete message or an RRC connection resume complete message has been transmitted or the measurement result has been reported; and stopping the measurements if the measurements are started at a predetermined moment before a paging occasion when a paging message is received, and the UE does not detect that the UE is paged at the paging occasion, wherein a time interval between the predetermined moment and the paging occasion is determined in a protocol or configured by a base station; and stopping the measurements after an RRC connection setup fails; or stopping the measurements after a connected-state measurement configuration is received; and stopping the measurements if a preset time duration has elapsed since the UE started the measurement, wherein the preset time duration is specified in a protocol or configured by a base station or is equal to a valid time of the measurement configuration information.

15. The UE according to claim 14, wherein the acquiring measurement configuration information comprises:
acquiring the measurement configuration information from a message broadcasted by a network or a radio resource control (RRC) dedicated message.

16. The UE according to claim 15, wherein, when the measurement configuration information is acquired from the RRC dedicated message, the starting, by the UE in a non-connection state, to perform measurements on the one or more frequencies according to the measurement configuration information comprises:
detecting whether the measurement configuration information from the RRC dedicated message is valid;
if the measurement configuration information from the RRC dedicated message is valid, starting to perform the measurements according to the measurement configuration information indicated by the RRC dedicated message.

17. The UE according to claim 16, wherein the detecting whether the measurement configuration information from the RRC dedicated message is valid comprises:
when it is detected that a preset condition is satisfied, determining that the measurement configuration information from the RRC dedicated message is invalid; otherwise, determining that the measurement configuration information from the RRC dedicated message is valid, wherein
the preset condition comprises one or more of following conditions:
a timer of the UE expires, wherein the timer starts when the UE receives the RRC dedicated message; or
the UE changes an attached cell; or
the UE enters the connected state; or
the UE performs a public land mobile network (PLMN) reselection.

18. A non-transitory computer-readable storage medium, storing therein a computer program, wherein the computer program is configured to be executed by a processor to implement a non-connection state measurement method, and the non-connection state measurement method comprises: acquiring measurement configuration information, wherein the measurement configuration information comprises one or more frequencies; starting, by the UE in a non-connection state, to perform measurements on the one or more frequencies according to the measurement configuration information; and reporting, by the UE after the UE enters a connected state from the non-connection state, a measurement result obtained from the measurement; wherein the method further comprises: stopping the measurements when a radio resource control (RRC) connection setup complete message or an RRC connection resume complete message is transmitted or the measurement result is reported; or stopping the measurements after an RRC connection setup complete message or an RRC connection resume complete message has been transmitted or the measurement result has been reported; and stopping the measurements if the measurements are started at a predetermined moment before a paging occasion when a paging message is received, and the UE does not detect that the UE is paged at the paging occasion, wherein a time interval between the predetermined moment and the paging occasion is determined in a protocol or configured by a base station; or stopping the measurements after an RRC connection setup fails; and stopping the measurements after a connected-state measurement configuration is received; and stopping the measurements if a preset time duration has elapsed since the UE started the measurement, wherein the preset time duration is specified in a protocol or configured by a base station or is equal to a valid time of the measurement configuration information.

* * * * *